US010474014B2

(12) United States Patent
Enochs

(10) Patent No.: US 10,474,014 B2
(45) Date of Patent: Nov. 12, 2019

(54) PROJECTOR LIFT

(71) Applicant: Draper, Inc., Spiceland, IN (US)

(72) Inventor: Steven E. Enochs, New Palestine, IN (US)

(73) Assignee: Draper, Inc., Spiceland, IN (US)

( * ) Notice: Subject to any disclaimer, the term of this patent is extended or adjusted under 35 U.S.C. 154(b) by 0 days.

(21) Appl. No.: 14/090,846

(22) Filed: Nov. 26, 2013

(65) Prior Publication Data

US 2014/0077052 A1    Mar. 20, 2014

Related U.S. Application Data

(63) Continuation of application No. 12/638,796, filed on Dec. 15, 2009, now Pat. No. 8,590,851, which is a continuation of application No. 10/164,241, filed on Jun. 5, 2002, now Pat. No. 7,631,848, which is a (Continued)

(51) Int. Cl.
| | |
|---|---|
| *G03B 21/00* | (2006.01) |
| *B66F 3/22* | (2006.01) |
| *F21V 21/04* | (2006.01) |
| *F21V 21/24* | (2006.01) |
| *F21V 21/36* | (2006.01) |
| *F16M 11/18* | (2006.01) |
| *F16M 11/24* | (2006.01) |
| *G03B 21/14* | (2006.01) |
| *B66F 7/06* | (2006.01) |
| *G03B 21/54* | (2006.01) |
| *E04B 9/00* | (2006.01) |

(52) U.S. Cl.
CPC ............ *G03B 21/14* (2013.01); *B66F 7/0666* (2013.01); *F21V 21/24* (2013.01); *G03B 21/54* (2013.01); *E04B 9/006* (2013.01); *F16M 11/18* (2013.01); *F16M 11/24* (2013.01); *F16M 2200/047* (2013.01)

(58) Field of Classification Search
CPC ....... G03B 21/14; G03B 21/54; B66F 7/0666; F21V 21/24; E04B 9/006; F16M 11/18; F16M 11/24; F16M 2200/047
USPC ..... 248/277.1, 317, 321, 329, 918; 254/267, 254/362; 312/23, 27, 247, 312; 296/37.7, 37.8
See application file for complete search history.

(56) References Cited

U.S. PATENT DOCUMENTS

| | | |
|---|---|---|
| 936,681 A | 10/1909 | Union |
| 1,325,463 A | 12/1919 | Comstock |
| 1,473,263 A | 11/1923 | Urban |
| (Continued) | | |

FOREIGN PATENT DOCUMENTS

EP     0 985 612     3/2000

OTHER PUBLICATIONS

Datalift, Data Projector Mounting System, Display Devices, Inc.; received by PTO Jul. 31, 1989.
(Continued)

*Primary Examiner* — Tan Le
(74) *Attorney, Agent, or Firm* — Faegre Baker Daniels LLP

(57) ABSTRACT

According to the present disclosure, a projector lift is provided to raise and lower a projector from the ceiling. The projector lift includes a first mount normally coupled to the ceiling, a second mount supporting the projector, a driver configured to raise and lower the second mount and projec-
(Continued)

tor, and a stabilizer extending between the first and second mounts.

18 Claims, 38 Drawing Sheets

Related U.S. Application Data continuation-in-part of application No. 09/877,755, filed on Jun. 8, 2001, now Pat. No. 6,637,711.

(56) References Cited

U.S. PATENT DOCUMENTS

| | | | |
|---|---|---|---|
| 1,748,068 A | | 2/1930 | Hood |
| 1,767,369 A | | 6/1930 | Johnson |
| 1,819,516 A | * | 8/1931 | Kelly ............................ 296/37.7 |
| 1,964,339 A | | 6/1934 | Brassell |
| 2,435,755 A | | 2/1948 | Schimpff |
| 2,933,198 A | | 4/1960 | Firestone et al. |
| 3,032,308 A | | 5/1962 | Hansen |
| 3,623,707 A | | 11/1971 | Klopp |
| 3,666,127 A | | 5/1972 | Guyaux |
| 3,672,104 A | | 6/1972 | Luckey |
| 3,759,475 A | | 9/1973 | Brown |
| 4,060,292 A | | 11/1977 | Medina |
| 4,103,463 A | | 8/1978 | Dixon |
| 4,159,162 A | | 6/1979 | Christoffel |
| 4,181,355 A | | 1/1980 | Grass et al. |
| 4,313,208 A | | 1/1982 | Kavenik |
| 4,412,601 A | | 11/1983 | Cooper |
| 4,435,031 A | | 3/1984 | Black et al. |
| 4,556,155 A | | 12/1985 | Koppensteiner |
| 4,664,434 A | | 5/1987 | Borst et al. |
| 4,684,164 A | | 8/1987 | Durham |
| 4,830,147 A | | 5/1989 | Kawada |
| 4,843,782 A | | 7/1989 | Gustaveson et al. |
| D302,618 S | | 8/1989 | Gottselig |
| 4,862,764 A | | 9/1989 | Gehring |
| D309,562 S | | 7/1990 | Boscacci et al. |
| 4,941,718 A | * | 7/1990 | Alexander et al. ........... 312/312 |
| 5,113,972 A | | 5/1992 | Haak, Sr. |
| 5,120,054 A | | 6/1992 | Wetzel |
| 5,261,645 A | | 11/1993 | Huffman |
| 5,366,203 A | * | 11/1994 | Huffman ........................ 254/362 |
| 5,379,977 A | | 1/1995 | Rönn et al. |
| 5,394,959 A | | 3/1995 | Cullity et al. |
| 5,487,524 A | | 1/1996 | Bergetz |
| 5,600,870 A | | 2/1997 | Fields et al. |
| 5,713,542 A | | 2/1998 | Benoit |
| D395,909 S | | 7/1998 | Moss et al. |
| 5,790,910 A | | 8/1998 | Haskin |
| 5,979,927 A | | 11/1999 | Hale |
| 6,137,629 A | * | 10/2000 | Shopp ............................ 359/461 |
| 6,345,799 B1 | | 2/2002 | Fusi |
| 6,367,377 B1 | | 4/2002 | Gawley et al. |
| 6,427,858 B2 | | 8/2002 | Sabounjian |
| 6,484,993 B2 | * | 11/2002 | Huffman ........................ 248/323 |
| 6,516,478 B2 | | 2/2003 | Cook et al. |
| 6,637,711 B2 | | 10/2003 | Enochs |
| 7,317,611 B2 | * | 1/2008 | Dittmer ........................ 248/917 |
| 7,431,482 B1 | * | 10/2008 | Morgan et al. ............... 362/364 |
| 7,631,848 B2 | | 12/2009 | Enochs |
| 2001/0050035 A1 | | 12/2001 | Mahnken |
| 2002/0092128 A1 | | 7/2002 | Houk, Jr. et al. |

OTHER PUBLICATIONS

SVS, Inc., "Lift Features and Benefits", Product Listing, Warranty Information, Architectural Specifications and Environmental Stability; http://www.svslisfts.com/arch.html; Feb. 8, 2001.

SVS, Inc., "About SVS Lift Systems", Product Listing, What are the Advantages of Purchasing a SVS Lift?; Lift Features and Benefits, Lift Accessories; webmaster@svslifts.com; 1997-1999.

Display Devices, Inc., "Taking Projection to New Heights", 2000, Revised Jan. 2001.

Display Devices Inc., "Taking Projection to New Heights", DataLite Data Lift Data Wide Specifications; www.displaydevices.com; date unknown.

Display Devices Inc., "Taking Projection to New Heights", DataLite Data Lift Datawide, Installation and Owners Manual; www.displaydevices.com; Dec. 15, 2000.

SVS Mini 4 Projector Lift Series, SVS 4 Projector Lift Series; SVS Inc.; date unknown.

SVC LCD-1 Lift; SVS, Inc.; date unknown.

Magna-Lift; Electric Service Lift for LCT, DLP and Data Projectors; http://www.chiefmfg.com/magnalift.html; Feb. 6, 2001.

Magna LCT/DLP Electric Ceiling Lifts; http://www.chiefmfg.com/magnalcddlp.html; Feb. 6, 2001.

36" Smart-Lift Electric Ceiling Lifts, Instruction Manual, Install the Projector on the Lift; pp. 8-13; date unknown.

Instruction Manual, 36" Smart-Lidt Electric Ceiling Lift; Chief Manufacturing Inc.; Part No. 8820-000002 (Rev. A); 2000 Chief Manufacturing; Nov. 2000.

Smart-Lift; Full-Line/Chief; http://www.chiefmfg.com/smartlift.html; Feb. 6, 2001.

Our Catalogue, Screens/Accessories; www.oray.ft/english/catalogue_accessories.html; date unknown.

ElectraMount, The Video Projector Protector, by Draper, 1999.

UniMount, UniMount Specifications; Video Projector Mount with Unibody Construction; by Draper, 1999.

LCD Mount, Compact, Lightweight Mount Fits Most LCD Projectors; LCD Mount Specifications; by Draper, 1999.

Scissor Lift; Scissor Lift Planning Sheet for SL and SLX Series; by Draper, 1998.

* cited by examiner

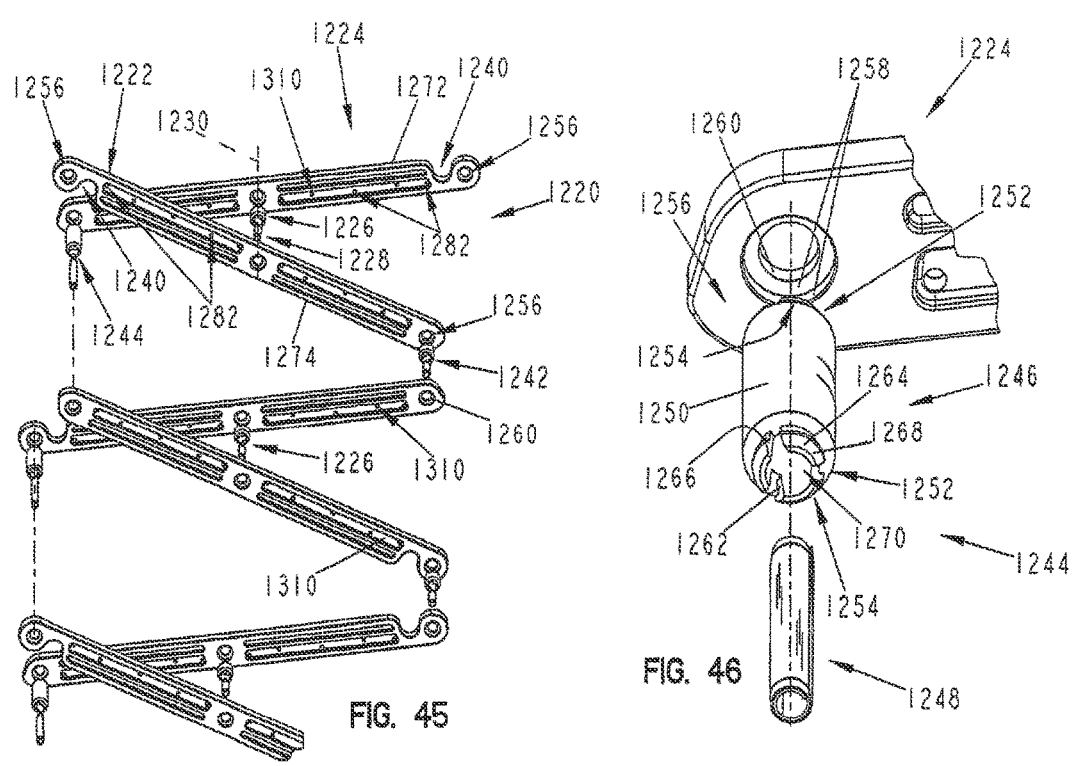

PROJECTOR LIFT

This application is a continuation of U.S. patent application Ser. No. 12/638,796 to Enochs, filed Dec. 15, 2009, which is a continuation of U.S. patent application Ser. No. 10/164,241 to Enochs, filed Jun. 5, 2002, which is a continuation-in-part of U.S. patent application Ser. No. 09/877,755 to Enochs, filed Jun. 8, 2001, the disclosures of which are expressly incorporated by reference herein.

BACKGROUND AND SUMMARY

This invention relates to devices configured to lower a projector from a ceiling. More particularly, the present invention relates to devices having scissor mechanisms configured to stabilize such a projector.

Video projectors are often hung or supported from the ceiling to project an image onto a movie screen or other surface. Projector lifts are provided to raise and lower the projector from the ceiling. Examples of such projector lifts are provided in U.S. Pat. No. 5,366,203 and U.S. Design Pat. No. 395,909.

According to an aspect of the present invention, an audio/visual system configured for use in a structure is provided. The system includes an audio/visual component and a component lift configured to raise and lower the component. The component lift includes a first mount adapted to be coupled to the structure, a second mount adapted to support the component, and a series of links extending between the first and second mounts. The series includes first and second links and a first coupler configured to couple the first and second links together. The first link includes a first aperture. The first coupler includes a plurality of flexible snap fingers sized to be inserted into the aperture to couple the first link to the first coupler.

According to another aspect of the present invention, a projector lift adapted to support a projector from a ceiling is provided. The projector lift includes a ceiling mount adapted to be coupled to a ceiling of a room, a projector mount adapted to support a projector, a plurality of links extending between the ceiling mount and the projector mount, the plurality of links including first and second links, and a coupler including a flexible member configured to couple the first and second links together.

According to another aspect of the present invention, a projector lift adapted to support a projector from a ceiling is provided. The projector lift includes a ceiling mount adapted to be coupled to a ceiling of a room, a projector mount adapted to support a projector, a plurality of links extending between the ceiling mount and the projector mount, the plurality of links including first and second links, and a coupler configured to snap fit with at least one of the first and second links to couple the first and second links together.

According to another aspect of the present invention, a projector lift adapted to support a projector from a ceiling is provided. The projector lift includes a ceiling mount adapted to be coupled to a ceiling of a room, a projector mount adapted to support a projector, a plurality of links extending between the ceiling mount and the projector mount, and a snap fastener configured to couple two of the plurality links together.

According to another aspect of the present invention, a projector lift adapted to support a projector from a ceiling is provided. The projector lift includes a ceiling mount adapted to be coupled to a ceiling of a room, a projector mount adapted to support a projector, and a first scissor pair extending between the ceiling and projector mounts. The first scissor pair including first and second scissor links coupled together to define an X-pattern. The project lift further includes first and second cables. The first cable extends along the first scissor link. The second cable extends along the second scissor link.

According to another aspect of the present invention, a projector lift adapted to support a projector from a ceiling is provided. The projector lift includes a ceiling mount adapted to be coupled to a ceiling of a room, a projector mount adapted to support a projector, and a first scissor pair extending between the ceiling and projector mounts. The first scissor pair includes first and second scissor links coupled together to define an X-pattern. The first scissor link includes a top surface, a bottom surface spaced apart from the top surface, and a pair of side surfaces. The projector lift further includes a first cable extending along the top or bottom surfaces of the first scissor link.

According to another aspect of the present invention, a projector lift adapted to support a projector from a ceiling is provided. The projector lift includes a ceiling mount adapted to be coupled to a ceiling of a room, a projector mount adapted to support a projector, and at least one scissor pair extending between the ceiling and projector mounts. The at least one scissor pair includes first and second scissor links coupled together to define an X-pattern. The first scissor link including an aperture therein. The projector lift further includes a first cable extending along the first scissor link and a coupler extending through the aperture in the first scissor link to couple the first cable to the first scissor link.

According to another aspect of the present invention, a projector lift adapted to support a projector from a ceiling is provided. The projector lift includes a ceiling mount adapted to be coupled to a ceiling of a room, a projector mount adapted to support a projector, and a first scissor pair extending between the ceiling and projector mounts. The first scissor pair includes first and second scissor links coupled together to define an X-pattern. The projector lift further includes a first cable extending along the first scissor link and a first shield positioned to protect the first cable from contacting another component during raising and lowering of the projector mount.

According to another aspect of the present invention, a projector lift adapted to support a projector from a ceiling is provided. The projector lift includes a ceiling mount adapted to be coupled to a ceiling of a room, a projector mount adapted to support a projector, and a first bumper positioned to cushion impact of the movement of the projector mount.

According to another aspect of the present invention, a series of scissor pairs is provided. The series has an extended length and a retracted length. Each of the scissor pairs of the series includes first and second scissor links having a length, width, and height. The retracted length of the series is less than the sum of the heights of the first scissor links.

According to another aspect of the present invention, a series of scissor pairs is provided. The series of scissor pairs has a first length and a second length that is longer than the first length. The scissor pairs includes first and second scissor links coupled to each other to pivot about a pivot axis. The scissor pairs are positioned in a side-by-side relationship in the direction of the pivot axis.

According to another aspect of the present invention, a series of scissor pairs is provided. Each scissor pair includes a first link and a second link pivotably coupled to the first link. At least one pair of first links is pivotably coupled together by a coupler that spans at least one second link.

According to another aspect of the present invention, a series of scissor pairs is provided. The series has extended and retracted lengths. The series includes a plurality of scissor pairs having extended and retracted lengths and means for coupling the plurality of scissor pairs together so that the retracted length of the series is less than the sum of the retracted lengths of the scissor pairs.

According to another aspect of the present invention, a series of scissor pairs is provided. The series of scissor pairs includes a first scissor pair and a second scissor pair. The first and second scissors pairs include a first link and a second link pivotably coupled to the first link. The first link of the first scissor pair moves in a first plane during pivoting. The first link of the second scissor pair moves in a second plane during pivoting. At least one of the second links of the first and second scissor pairs is positioned between the first and second planes.

According to another aspect of the present invention, a projector lift is provided that is adapted to support a projector from a ceiling. The projector lift includes a ceiling mount adapted to be coupled to a ceiling of a room. The ceiling mount has an outer perimeter. The projector lift further includes a projector mount adapted to support a projector. The projector mount has an outer perimeter. The outer perimeter of the ceiling mount and the outer perimeter of the projector mount cooperate to define a column of space between the ceiling mount and the projector mount. The projector lift further includes a series of links extending between the ceiling mount and the projector mount. At least a portion of the series of links is positioned within the column of space.

According to another aspect of the present invention, a projector lift is provided that is adapted to support a projector from a ceiling. The projector lift includes a ceiling mount adapted to be coupled to a ceiling of a room. The ceiling mount includes a perimeter wall and a bracket positioned in an interior region formed by the perimeter wall. The projector lift includes a projector mount adapted to support a projector and a series of links extending between the ceiling mount and the projector mount to support the projector mount. At least one link of the series of links is coupled to the bracket of the ceiling mount.

According to another aspect of the present invention, an audio/visual system for use in a structure is provided. The system includes an audio/visual component and a component lift. The component lift is supported by the structure and coupled to the component to raise and lower the component. The component lift includes a first mount adapted to couple to the structure, a second mount coupled to the component, a driver configured to raise and lower the second mount, and a stabilizer configured to stabilize the second mount. The first and second mounts each have an outer perimeter. The outer perimeter of the first mount and the outer perimeter of the second mount cooperate to define a column of space between the first mount and the second mount. At least a portion of the stabilizer is positioned in the column of space.

Additional features of the disclosure will become apparent to those skilled in the art upon consideration of the following detailed description when taken in conjunction with the accompanying drawings.

BRIEF DESCRIPTION OF THE DRAWINGS

A detailed description particularly refers to the accompanying figures in which:

FIG. 45 a partial assembly view of one stabilizer of the projector lift of FIG. 43;

FIG. 46 an enlarged view of a portion of FIG. 45 showing a link coupler and pin positioned for assembly to a link.

DETAILED DESCRIPTION OF THE DRAWINGS

Figure 1:
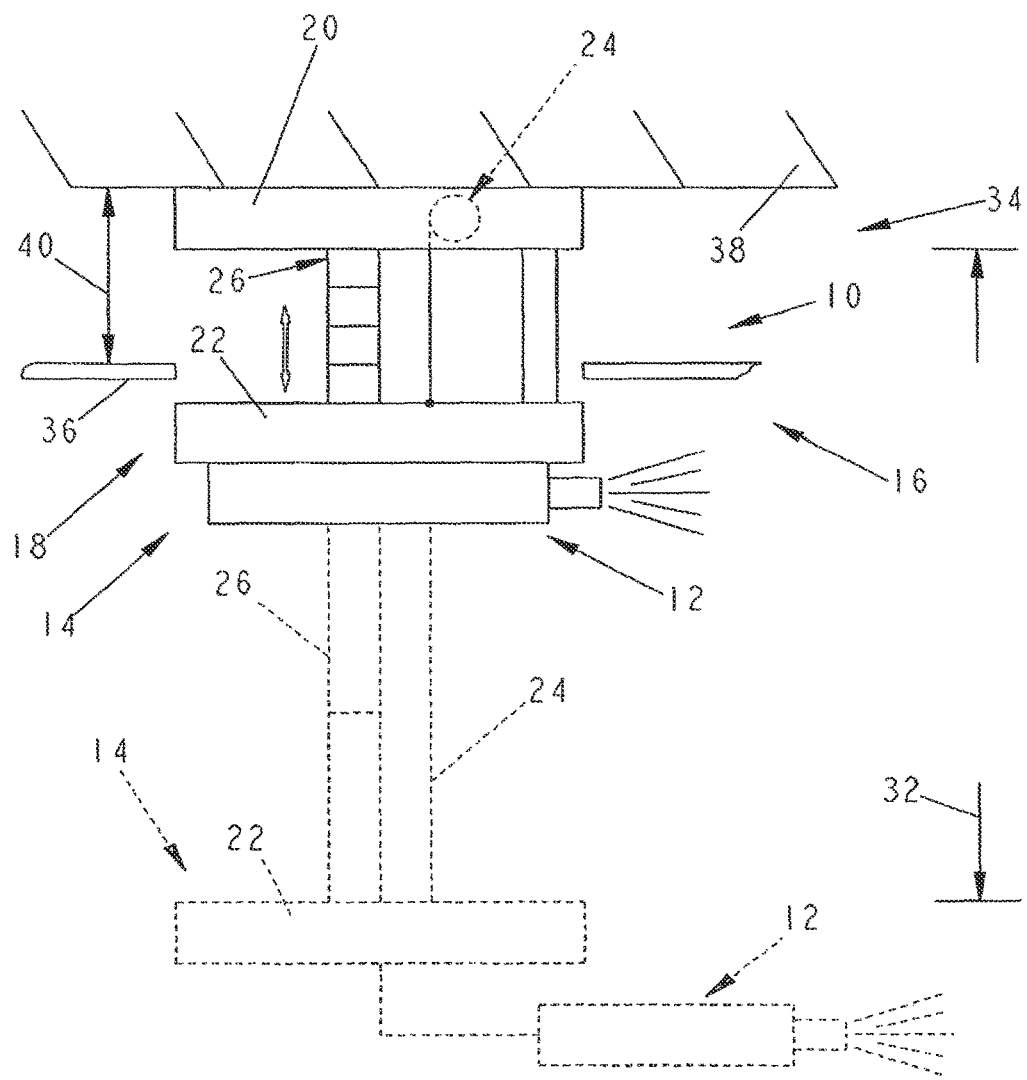
FIG. 1 is a side elevation view of a projector lift supporting a projector showing the projector lift including a ceiling mount coupled to the ceiling, a projector mount supporting the projector, an extendable stabilizer extending between the ceiling and projector mounts, and a driver (partially shown in phantom) also extending between the ceiling and projector mounts to raise and lower the projector mount and projector coupled thereto.

An audio/visual system 10 in accordance with the present disclosure is shown in FIG. 1. System 10 includes a projector 12 and a projector lift 14. Lift 14 is configured to move projector 12 from a storage position to a use position where projector 12 shines an image on a projection screen (not shown) or other surface.

When in the storage position, lift 14 and projector 12 are preferably concealed in a ceiling 16 of a structure, such as a conference room. Thus, when projector 12 is not in use, it is tucked up in ceiling 16 and not visible so that the aesthetic qualities of the room are maintained. To use projector 12, lift 14 lowers projector 12 into the room so that the image can be shown on the projection screen.

As shown in FIG. 1, lift 14 includes a housing 18 having a ceiling mount 20 coupled to ceiling 16 of the structure and a projector mount 22 supporting projector 12. Lift 14 further includes a driver 24 that raises and lower projector mount 22 and projector 12 relative to ceiling mount 20 and ceiling 16. Lift 14 further includes one or more stabilizers 26 that stabilize projector mount 22 during raising, lowering, and/or operation of projector 12.

Figure 2:
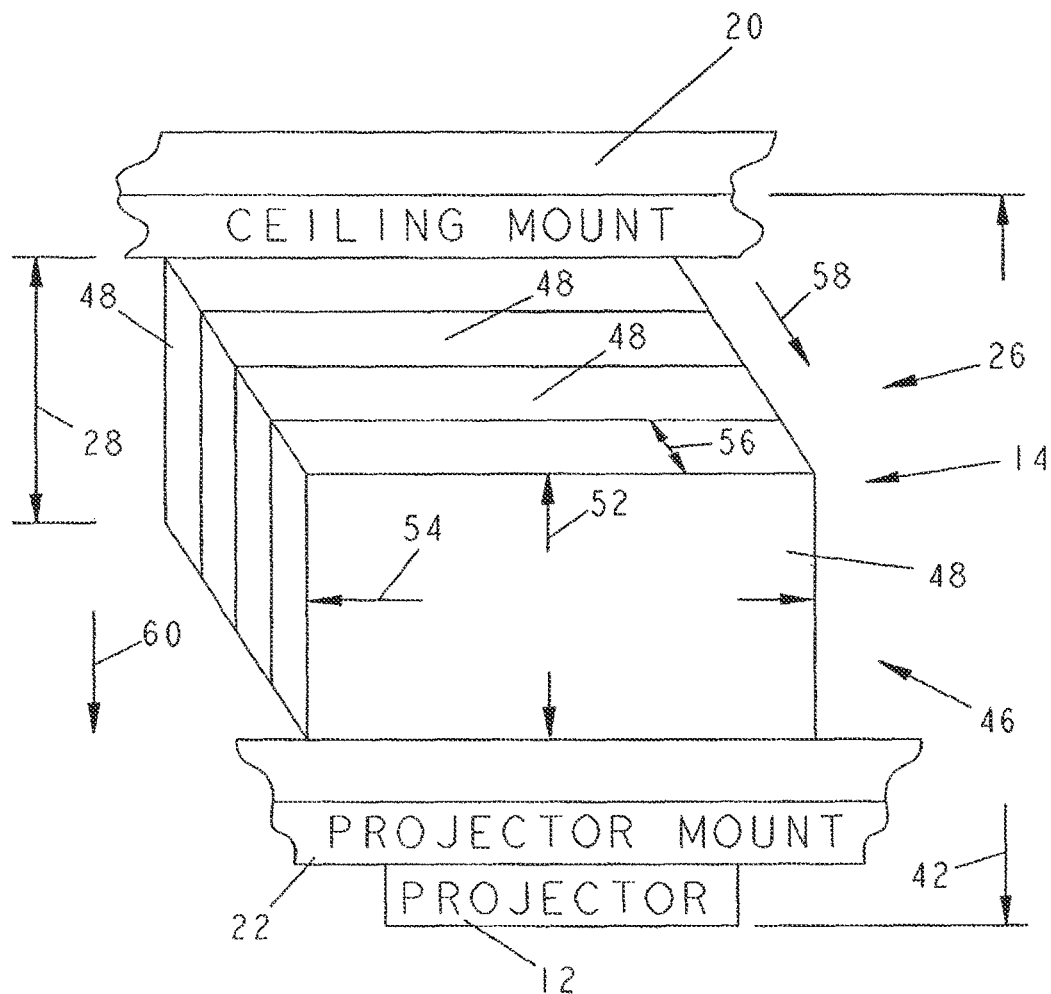
FIG. 2 is an enlarged perspective view of the projector lift of FIG. 1 showing the stabilizer in a retracted position.
Figure 3:
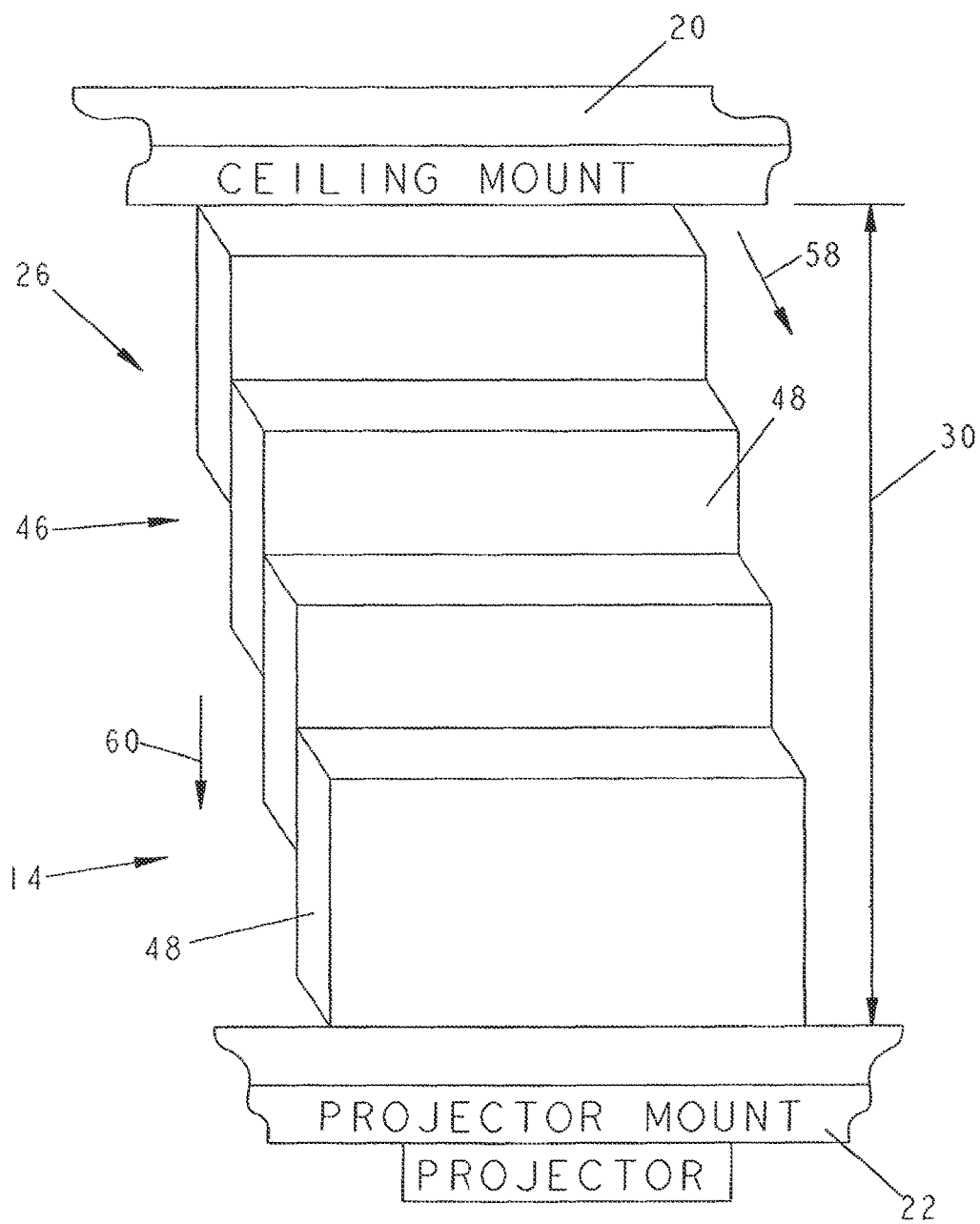
FIG. 3 is a view similar to FIG. 2 showing the stabilizer in an extended position.

The overall length of stabilizer 26 changes as projector 12 is raised and lowered by driver 22. For example, when projector 12 is in the storage position, stabilizer 26 had a retracted length 28, as shown in FIG. 2, and when projector 12 is in the use position, stabilizer 26 has an extended length 30, as shown in FIG. 3, that is greater than retracted length 28.

Lift 14 is preferably configured to lower projector 12 to a service position where it is convenient to add or remove projector 12 from projector mount 22 for installation, service, or replacement. The service position, shown in phantom in FIG. 1, is below the use position so that a service technician can install, service, or remove projector 12 while standing on the floor. To permit projector 12 to be lowered for servicing, stabilizer 26 must extend beyond length 30 to a further extended service length 32 permitting a technician to install, remove, and/or repair projector 14.

In many instances, a space 34, shown in FIG. 1, between a lower ceiling surface 36 and ceiling structure 38, such as the floor joist, ceiling rafters, or other structure to which lift 14 is mounted, is limited. For example, as shown in FIG. 1, distance 40 indicates the limited clearance between structure 38 and ceiling surface 36. Therefore, if projector 12 is to be positioned totally within ceiling 16, system 10 must have an overall retracted height 42, shown in FIG. 2, that is less than or equal to distance 40. According to an alternative installation of the system, the lift is mounted on the ceiling surface or elsewhere so that the projector is positioned below the ceiling when in the retracted or storage position.

To reduce overall height 42 of system 10 when in the storage position, stabilizer 26 is configured to have minimal retracted length 28. As shown in FIG. 2, stabilizer 26 includes a series 46 of extension units 48. Extension units 48 cooperate to give series 46 extended length 30 and retracted length 28. Each unit 48 has a height 52, length 54, and a width 56. As shown in FIG. 2, when series 46 is fully retracted, retracted length 28 of stabilizer 26 is equal to height 52 of one of units 48.

Extension units 48 are stacked side-by-side in a direction 58 that is lateral or non-parallel to a direction 60 of extension and retraction of series 46. Preferably, the addition of more extension units 48 to series 46 increases extended length 30 of stabilizer 26 to permit lowering of projector 12 to the service position, but does not increase retracted length 28 of stabilizer 26. According to alternative embodiments of the present disclosure, the addition of some extensions units increases the retracted length of the stabilizers.

Figure 4:
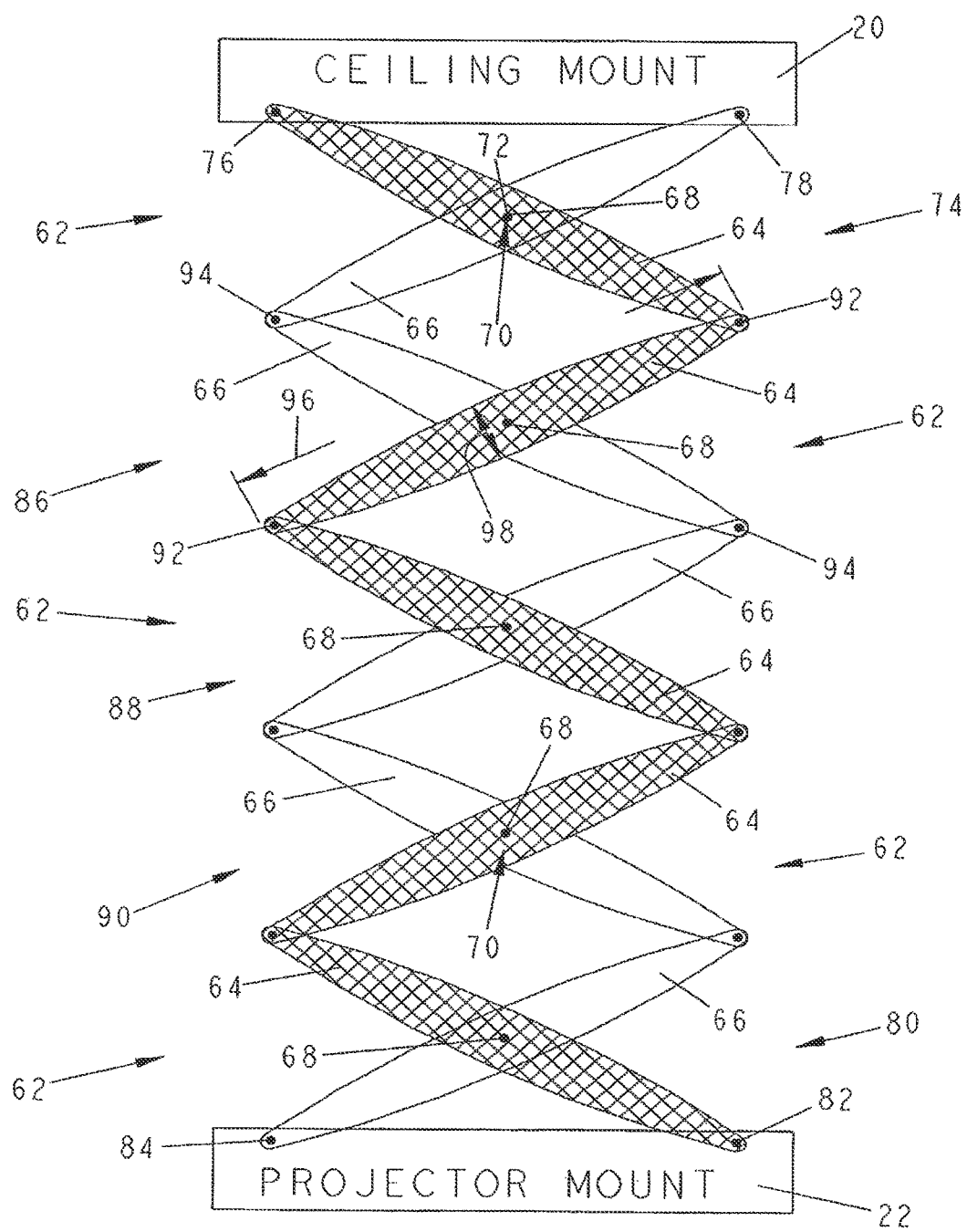
FIG. 4 is a diagrammatic side elevation view of one embodiment of a stabilizer extending from the ceiling mount to the projector mount showing the stabilizer including a series of five scissor pairs each including a first link (shown in grey) and a second link.

According to the preferred embodiment of the present disclosure, extension units 48 are scissor pairs 62 as shown in FIG. 4. Each respective scissor pair 62 extends or is oriented between ceiling mount 20 and projector mount 22. According to alternative embodiments of the present disclosure, other extension units such as telescoping members (tubes, sliding plates, etc.), standard scissor pairs (see, for example, U.S. Design Pat. 395,909, the disclosure of which is expressly incorporated by reference herein), rigid bellows, or other extension units known to those of ordinary skill in the art are used.

Preferably, each scissor pair 62 includes a first link 64 (shown in gray) and a second link 66 coupled to respective first link 64 by a pair coupler 68 at a pivot location 70 to pivot about a pivot axis 72. (Reference to components as first, second, third, etc. is used to provide a convenient reference to otherwise similar or identical components, but is not intended to limit those components to a specific sequence or location). First and second links 64, 66 of a first pair 74 are preferably coupled to ceiling mount 20 by respective ceiling mount couplers 76, 78. Similarly, first and second links 64, 66 of a fifth or last pair 80 are preferably coupled to projector mount 22 by respective projector mount couplers 82, 84. First links 64 of intermediate pairs 86, 88, 90 are coupled to one another by first link couplers 92 and second links 66 of intermediate pairs 86, 88, 90 are coupled to one another by second link couplers 94.

Figure 5:
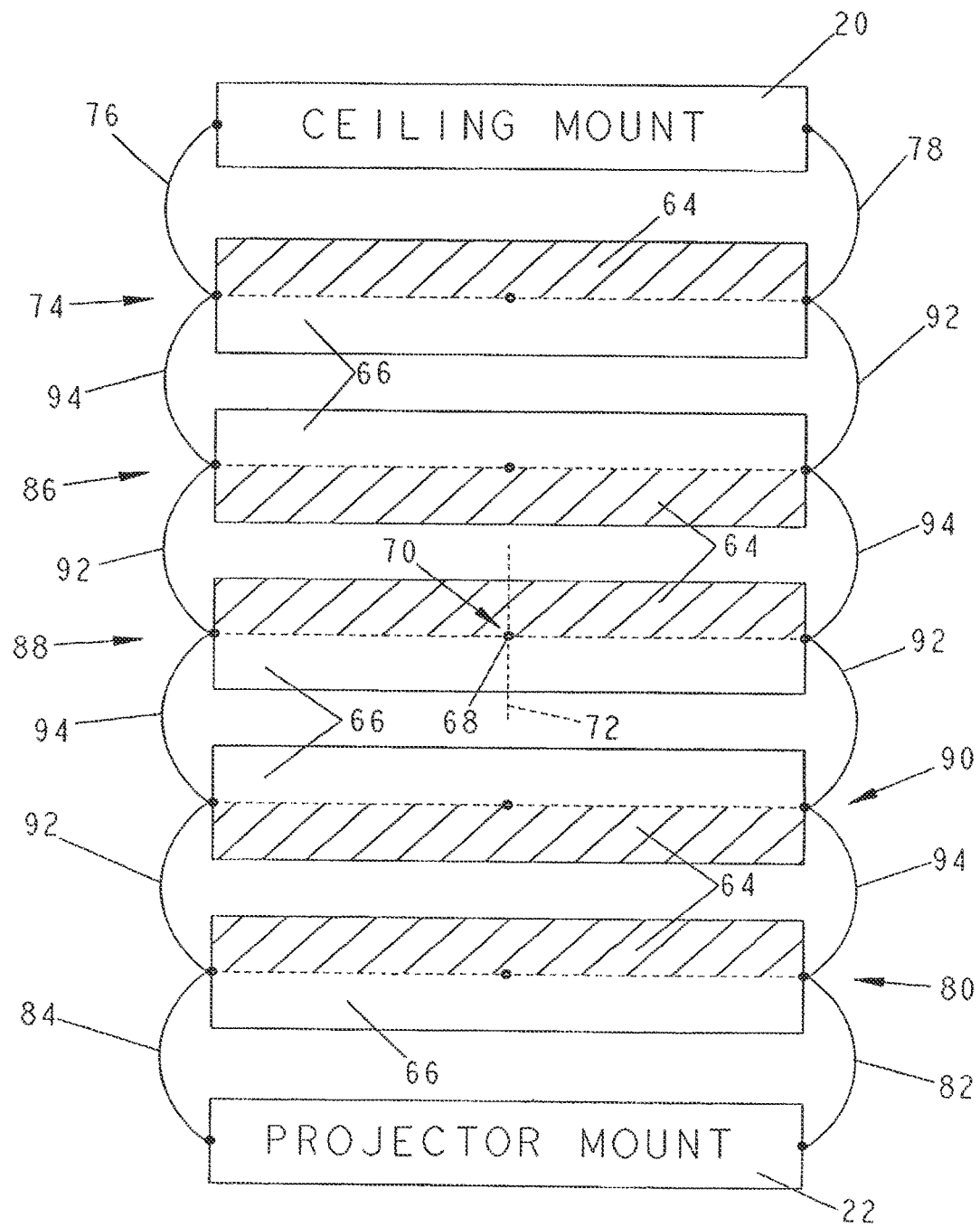
FIG. 5 is a top plan view of the series of scissor pairs of FIG. 5 showing the scissor pairs positioned in a side-by-side relationship with a first of the scissor pairs positioned adjacent to the ceiling mount and a fifth of the scissor pairs positioned adjacent to the projector mount.

As shown in FIG. 5, preferably, each first link 64 is positioned adjacent to respective second link 66 of the same scissor pair 62. However, according to the present disclosure, links 64, 66 from other pairs may be positioned between the respective first and second links 64, 66 of a pair 62. See, for example, FIG. 26. According to some embodiments of the present disclosure, the link arrangement alternates first link 64, second link 66, first link 64, second link 66 in their position relative to mount 20 as shown, for example in FIG. 6. According to the present disclosure, other alternative arrangements are also provided. For example, according to the preferred embodiment of the present disclosure, the link arrangement alternates first link 64, second link 66, second link 66, first link 64, in their position relative to mount 20 as shown in FIG. 7.

Figure 6:
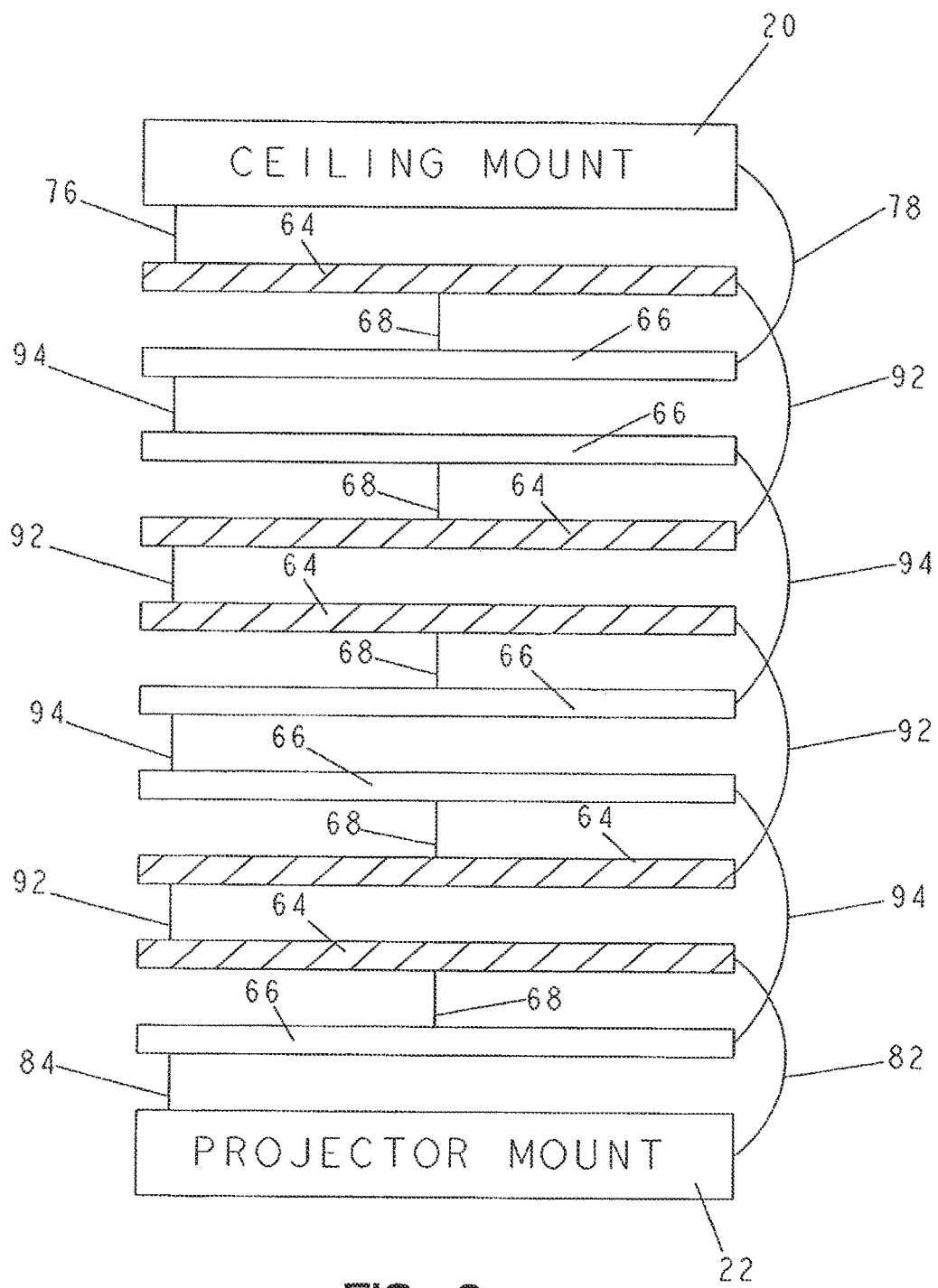
FIG. 6 is view similar to FIG. 5 showing a preferred arrangement of couplers configured to couple the links together.
Figure 7:
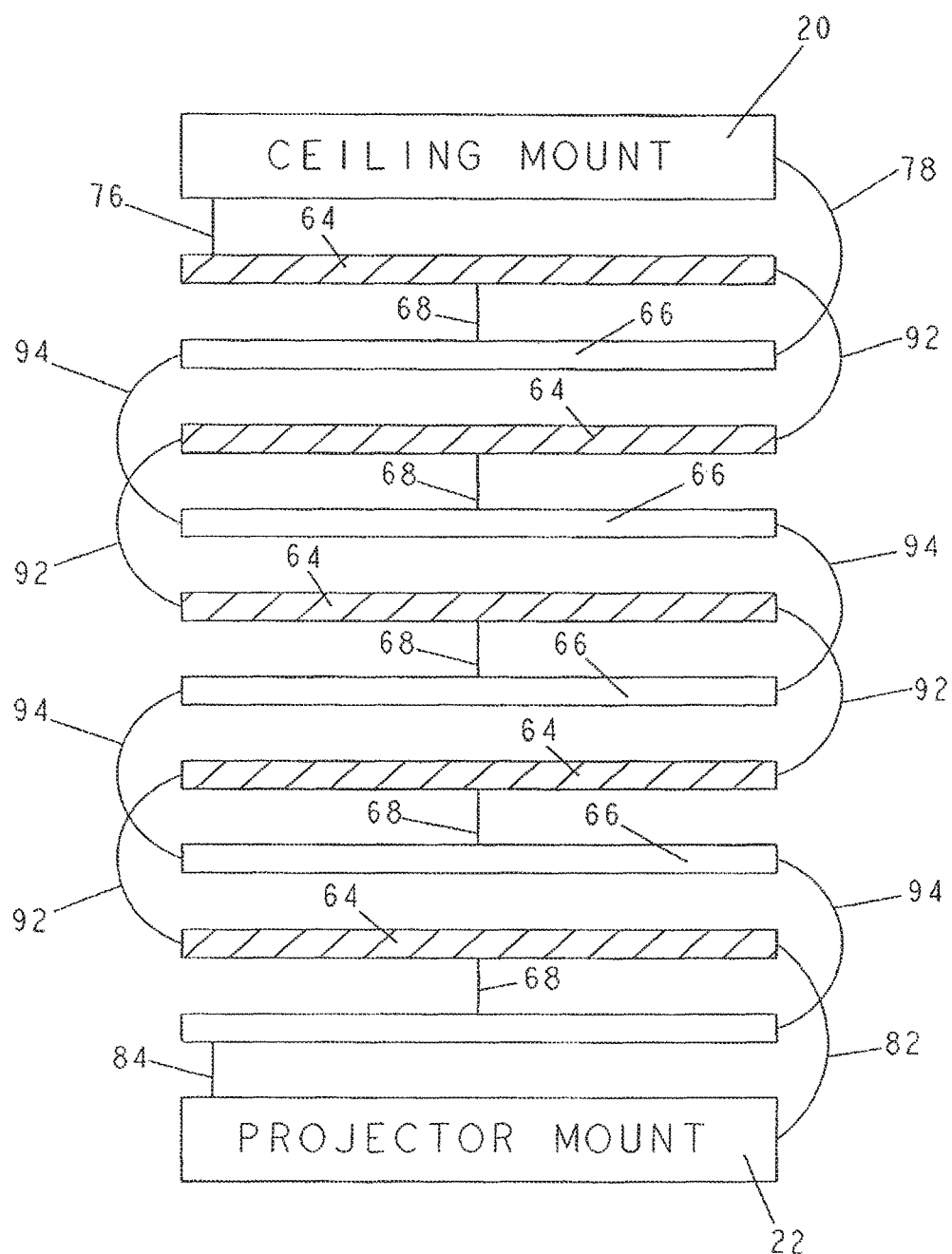
FIG. 7 is a view similar to FIG. 6 showing an alternative arrangement of couplers configured to couple the links together.

As shown in FIG. 6, first and second link couplers 92, 94 are provided to couple first and second links 64, 66 together. Some first link couplers 92 span an intermediate second link 66. Similarly, some second links couplers 94 span an intermediate first link 64. According to some embodiments of the present disclosure, some of first link couplers 92 (shown on the right) span two intermediate second links 66 and other first link couplers 92 (shown on the left) do not span any intermediate second links 66. See also, for example, FIG. 7. Similarly, some of second link couplers 94 (shown on the right) span two intermediate first links 64 and other second link couplers 94 (shown on the left) do not span any intermediate first links 64. Spanning permits scissor pairs 62 to be positioned side-by-side in a direction lateral or non-parallel to the extension of the series of scissor pairs 62, as shown in FIG. 4.

Preferably, couplers 68, 76, 78, 82, 84, 92, 94 and links 64, 66 are configured to permit series 46 to move to minimal retracted length 28. Each link 64, 66 has a length 96, height 98, and a width. Preferably, when series 46 is in its retracted position, the retracted length of series 46 is substantially equal to height 98.

Couplers 68, 76, 78, 82, 84, 92, 94 and links 64, 66 cooperate to permit the couplers to span respective intermediate links 64, 66, if any, and permit series 46 to collapse to height 98. According to alternative embodiments of the present disclosure, the series does not fully collapse to the height of a single link but collapses to other heights less than the sum of the height of the links. For example, according to one embodiment of the present disclosure, the series collapses to three-quarters of the sum of heights of the first links. According to other embodiments of the present disclosure, the series collapses to one-half, one-quarter, or some other fraction of the sum of the heights of the first links. According to other embodiments, the series collapses to a height greater than or equal to the sum of the height of the links.

Figure 8:
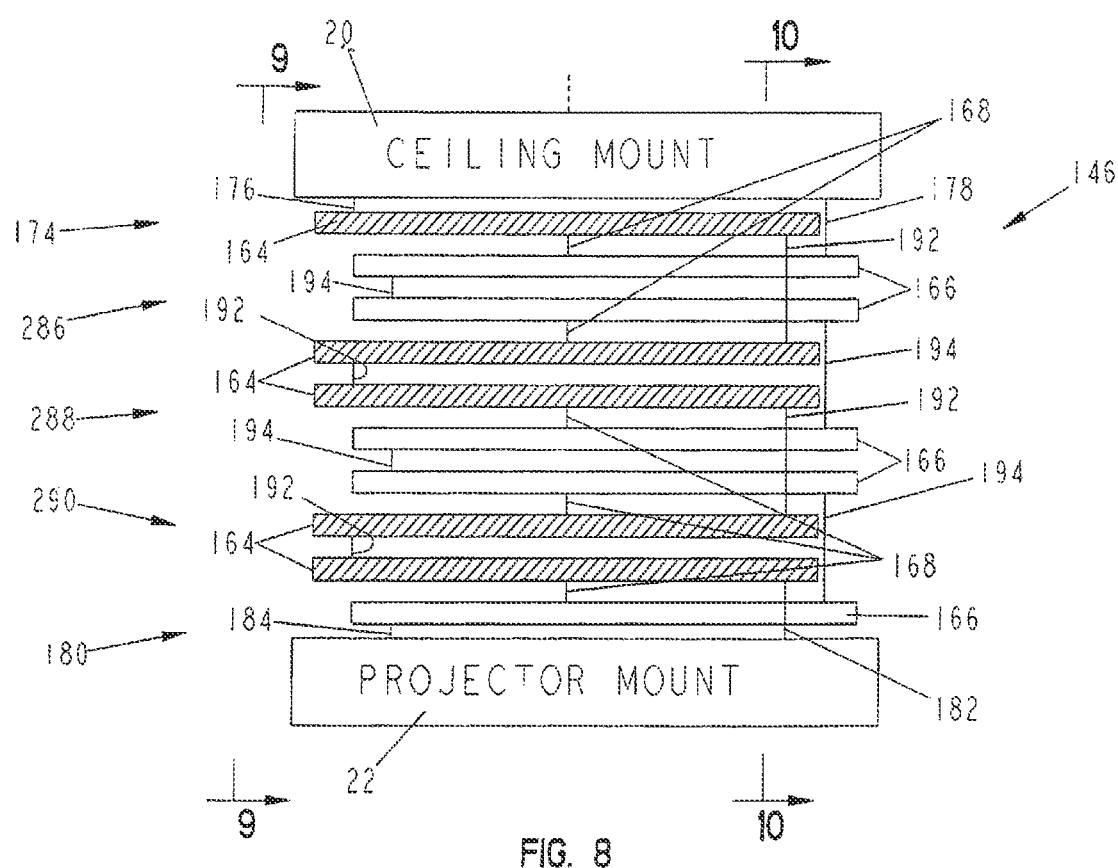
FIG. 8 is a view similar to FIG. 6 showing a preferred arrangements of links and couplers configured to couple the links together.
Figures 9, 10:
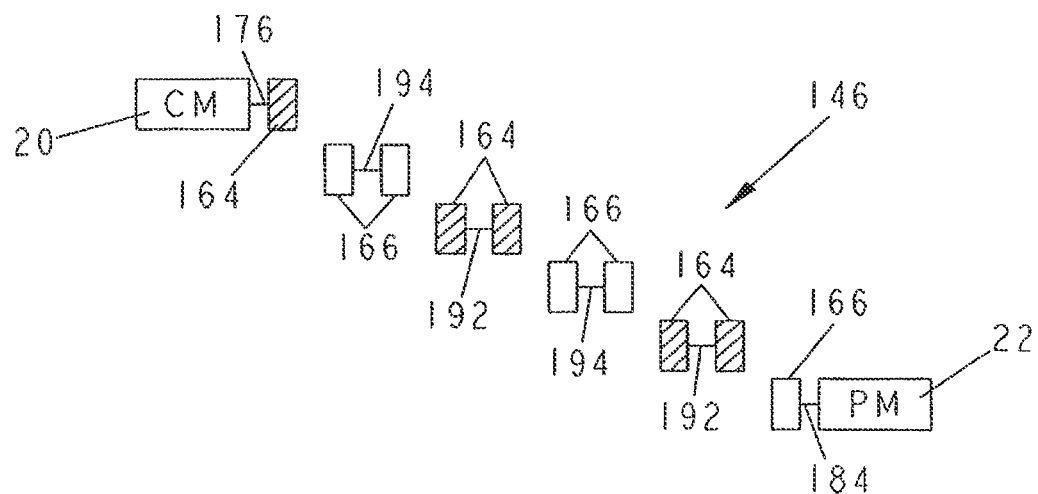
FIG. 9 is an end view taken along line 9-9 of FIG. 8 showing the relative position of the ends of the links of FIG. 8 when the series is partially extended.
FIG. 10 is a view similar to FIG. 9 taken along line 10-10 of FIG. 9.

According to a preferred embodiment of the present disclosure, shown in FIGS. 8-10, a series 146 is provided including a plurality of first and second links 164, 166 and respective couplers 168, 176, 178, 182, 184, 192, 192', 194, 194' that couple links 164, 166 together and to mounts 20, 22. Notches 112 formed in second links 166 permit series 146 to collapse to a retracted height 198. As shown in the diagrammatic view of the preferred embodiment in FIGS. 8-10, five scissor pairs 162 are provided. According to alternative embodiments of the present disclosure, fewer or more pair(s) are provided with the various disclosed embodiments. For example, according to one embodiment, only one scissor pair is provided. According to others, as many scissor pairs as needed to reach the proper extended length are provided.

As shown in FIG. 8, first links 164 and second links 166 alternate in pairs in their position relative to ceiling mount 20. Mount coupler 176 couples first link 164 of first pair 174 to mount 20 without spanning a second link 166. Mount coupler 178 spans first link 164 of first pair 174 to pivotably couple second link 166 of first pair 174 to mount 20. Mount coupler 182 spans second link 164 of last pair 180 to couple first link 164 of last pair 180 to projector mount 22. Mount coupler 184 couples second link 164 to mount 22 without spanning a first link 164.

A plurality of pair couplers 168 couple the respective first and second links 164, 166 of scissor pairs 162 together. As shown in FIG. 8, pair couplers 168 are offset from midpoints of links 164, 166 so that the length of each link 164, 166 on either side of the respective pair couplers 168 is different. For example, more of first link 164 of first pair 174 is positioned to the left of pair coupler 168 than is positioned to the right of pair coupler 168. Similarly, more of second link 166 of first pair 174 is positioned to the right of pair coupler 168 than is positioned to the left of pair coupler 168.

As shown in FIG. 8, first link couplers 192, 192' extend between and couple respective first links 164 together. First link coupler 192 spans second links 166 of first and second pairs 174, 186 to couple first link 164 of first pair 174 to first link 164 of second pair 186. First link coupler 192' couples first link 164 of second pair 186 to first link 164 of third pair 188 without spanning any intermediate second links 166. This pattern of coupling first links 164 continues until first link 164 of fifth pair 180.

Second link couplers 194, 194' extend between and couple respective second links 166 together. Second link coupler 194 couples second link 166 of first pair 174 to second link 166 of second pair 186 without spanning any intermediate first links 164. Second link coupler 194' spans first links 164 of second and third pairs 186, 188 to couple second link 166 of second pair 186 to second link 166 of third pair 188. This pattern of coupling second links 166 continues until second link 166 of fifth pair 180.

During extension and retraction of series 146, each of the individual first and second links 164, 166, and scissor pairs 162 moves in a respective vertical plane. For example, first pair 174 moves in a vertical plane that is off center from and parallel to a different vertical plane in which second pair 186 moves. Similarly, first link 164 of first pair 174 rotates or pivots in a vertical plane that is adjacent to and parallel to a vertical plane in which second link 166 of first pair 174 rotates or pivots. These two planes cooperate to define the vertical plane in which first pair 174 moves. First link 164 of second pair 186 also rotates in a vertical plane this is laterally spaced apart from the plane of first link 164 of first pair 174. Second link 166 of first pair 174 is positioned between these planes.

As shown in FIG. 10 (see also FIG. 39), second link 166 of first pair 174 includes a notch 112 on a bottom side 114 thereof. (FIGS. 9, 10, 12, 13, 15, 16, 18, 19, 21, 22, 24, 25, 27, 28, and 29 are taken through the links at the location of the respective couplers) Notch 112 is positioned to receive first link coupler 192 to provide clearance therefor so that first links 164 of first and second pairs 174, 186 can fully collapse. Therefore, when series 146 is fully collapsed, first links 164 of first and second pairs 174, 186 are at substantially the same level as second link 166 of first pair 174.

Second link 166 of second pair 186 includes a notch 112 on a top side 116 thereof. This notch 112 is also positioned to receive first link coupler 192 to provide clearance therefor so that second and third pairs 186, 188 fully collapse. Notches 112 are also provided on bottom sides 114 of second links 166 of third and fifth pairs 188, 180 and on top sides 116 of second link 166 of fourth pair 190. Thus, notches 112 provide one way of permitting couplers 192 to span one or more intermediate second links 166 by passing couplers 192 through respective second links 166. According to alternative embodiments of the present disclosure, notches in the links are not provided and the scissor pairs do not fully collapse, but only partially collapse.

According to the preferred embodiment of the present disclosure, the relative location of first and second links 164, 166 of scissor pairs 162 and pair couplers 168 provides one way for couplers 194' to span one or more intermediate first links 164. As shown in FIG. 8, the location of coupler 194' on second links 166 of first and second pairs 174, 186 is beyond the ends of first links 164 of second and third pairs 186, 188. Thus, a space 118 exists between coupler 194' and the ends of first links 164 of second and third pairs 186, 188 to provide clearance for first links 164 of second and third pairs 186, 188 to fully collapse. Similarly, mount coupler 178 is spaced apart from first link 164 of first pair 174 to permit first pair 174 to fully collapse. According to alternative embodiments of the present disclosure (see, for example, FIGS. 5, 6, 7, and 11, 14, 20, and 23), the pair coupler is located on the midpoint of the respective links.

Figure 17:
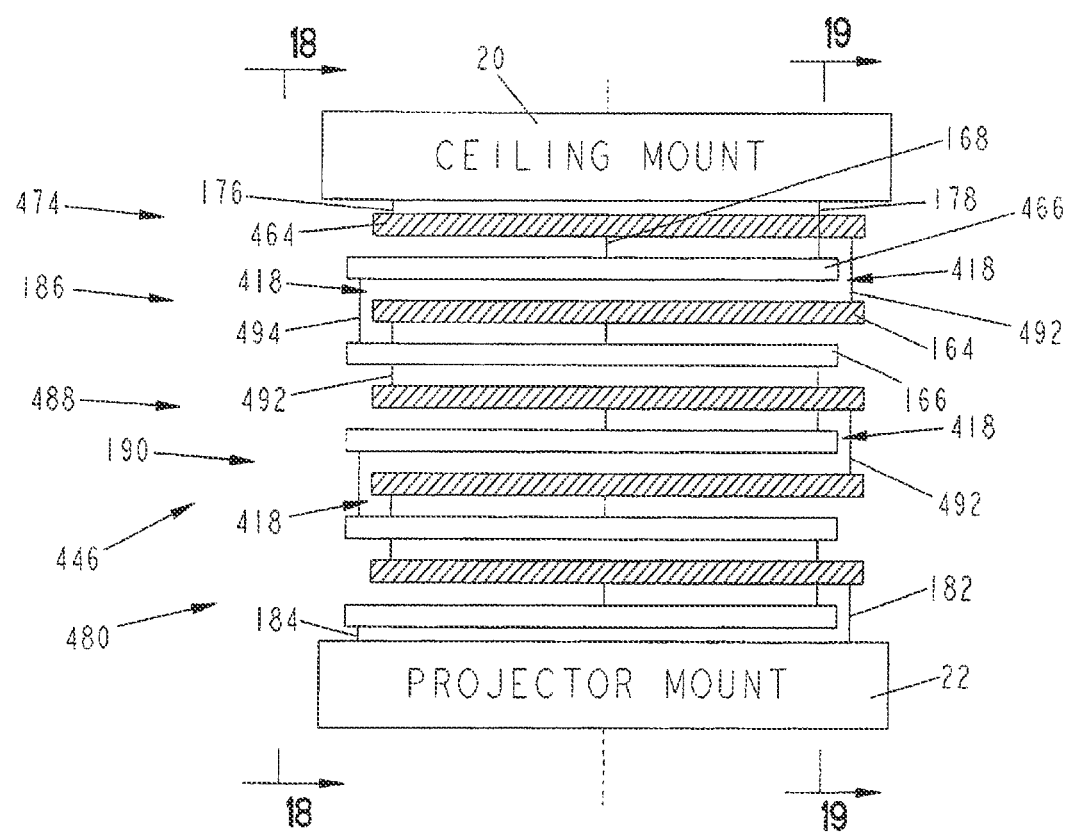
FIG. 17 is a view similar to FIG. 6 showing a third alternative embodiment arrangement of links and couplers configured to couple the links together showing the links arranged in an alternating pattern.
Figure 18:
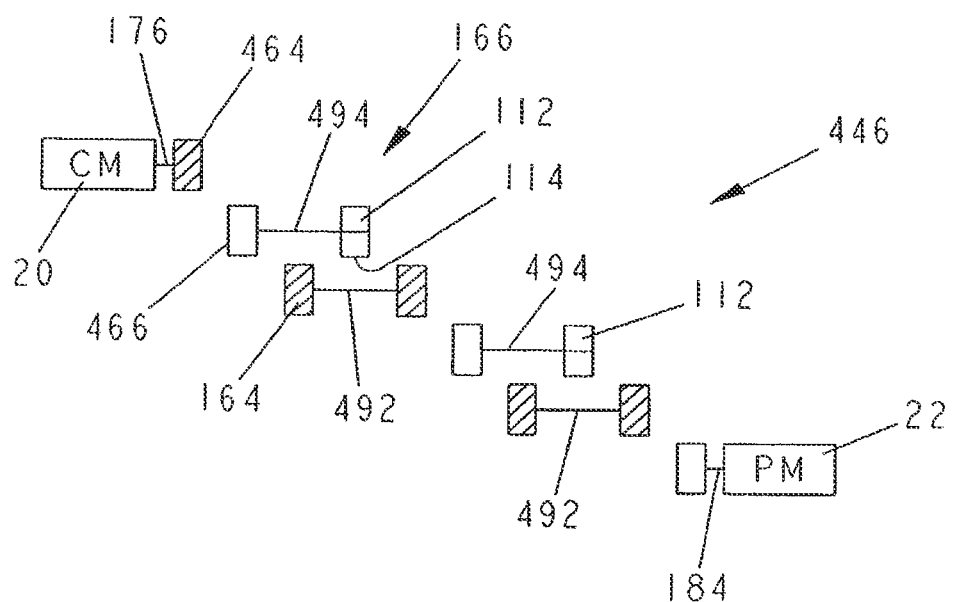
FIG. 18 is an end view taken along line 18-18 of FIG. 17 showing the relative position of the ends of the links of FIG. 17 when the series is partially extended.
Figure 19:
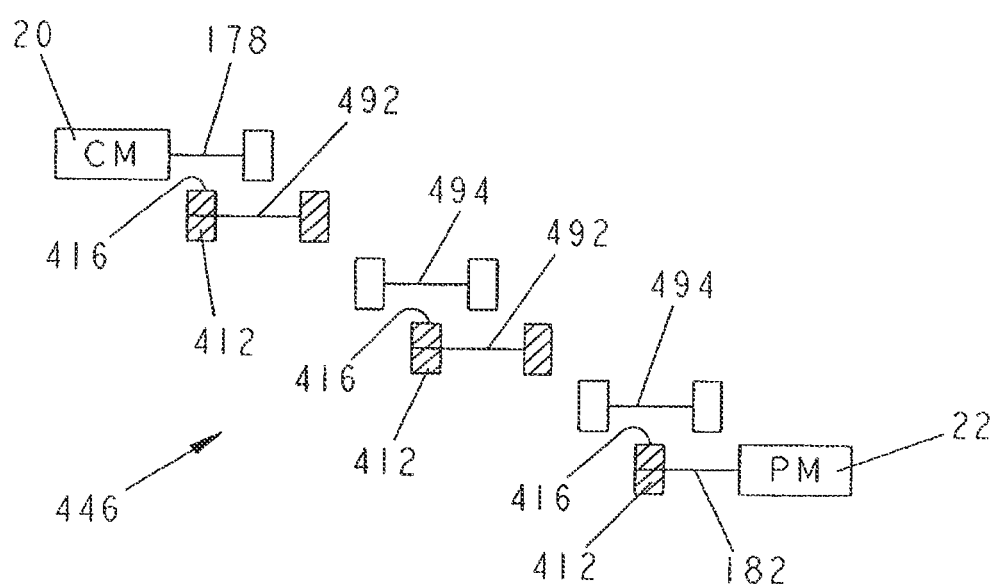
FIG. 19 is a view similar to FIG. 18 taken along line 19-19 of FIG. 17.
Figure 20:
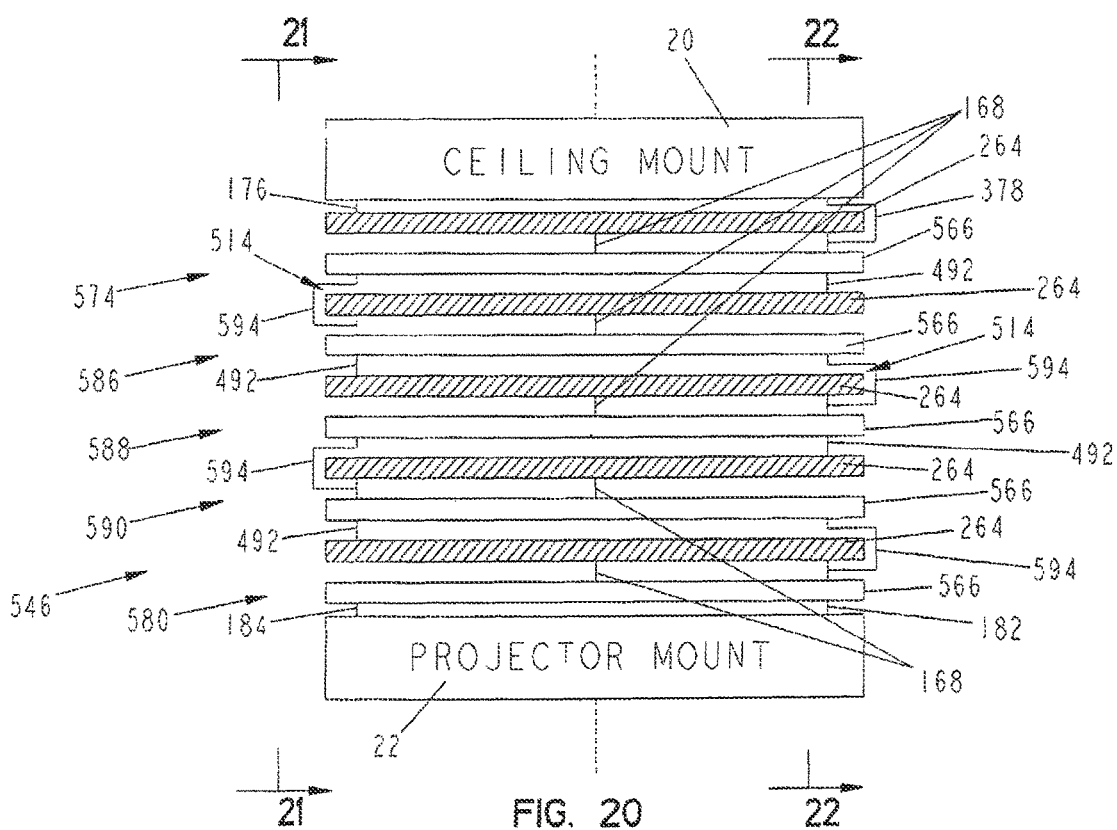
FIG. 20 is a view similar to FIG. 6 showing a fourth alternative embodiment arrangement of links and couplers configured to couple the links together showing the alternating link pattern of FIG. 17 and some of the couplers extending around the ends of intermediate links.
Figure 21:
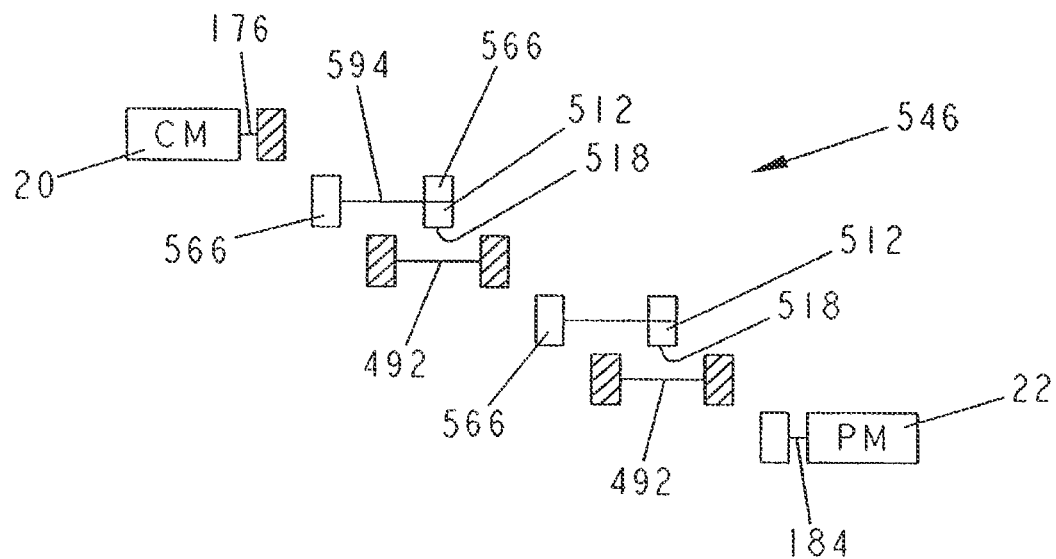
FIG. 21 is an end view taken along line 21-21 of FIG. 20 showing the relative position of the ends of the links of FIG. 20 when the series is partially extended.
Figure 22:
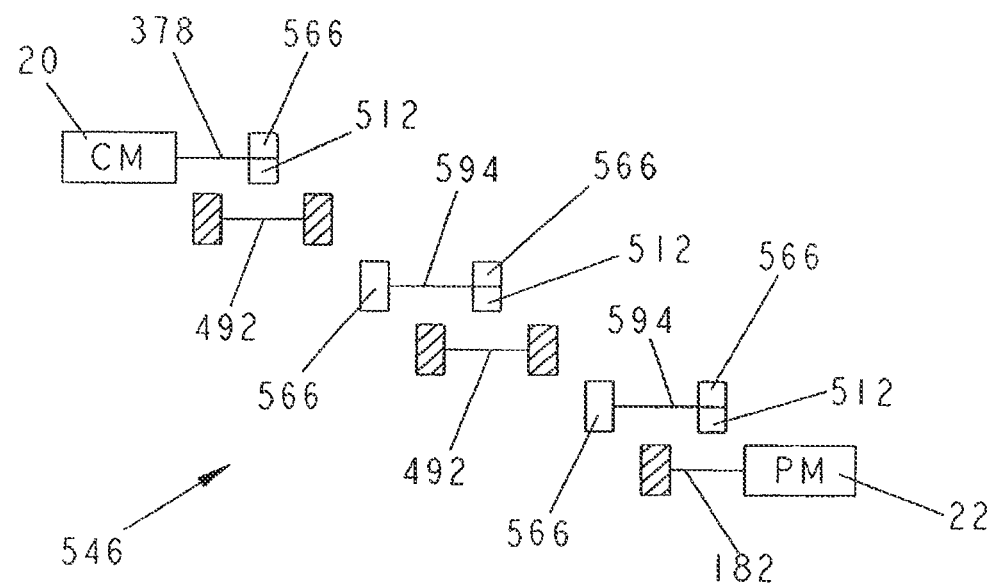
FIG. 22 is a view similar to FIG. 21 taken along line 22-22 of FIG. 20.
Figure 23:
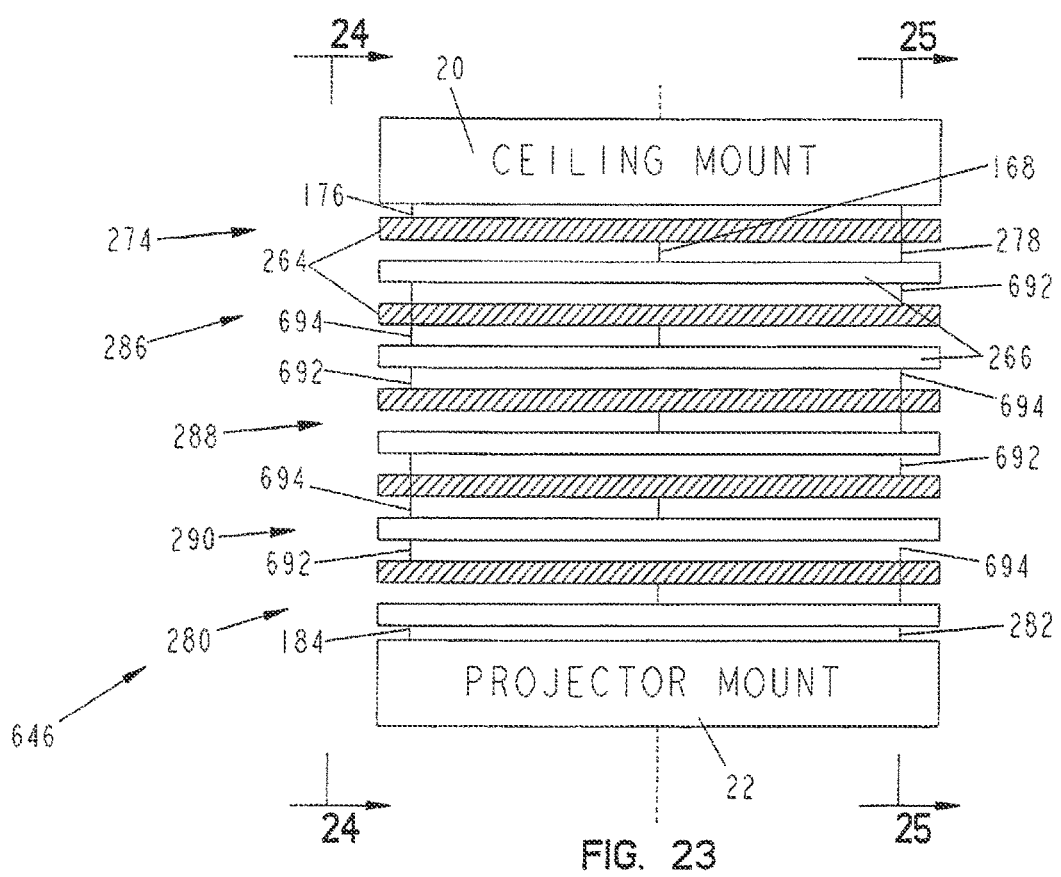
FIG. 23 is a view similar to FIG. 6 showing a fifth alternative embodiment arrangement of links and couplers configured to couple the links together showing the alternating link pattern of FIG. 17 and some of the couplers including notches to provide clearance for the intermediate links that they span.
Figure 24:
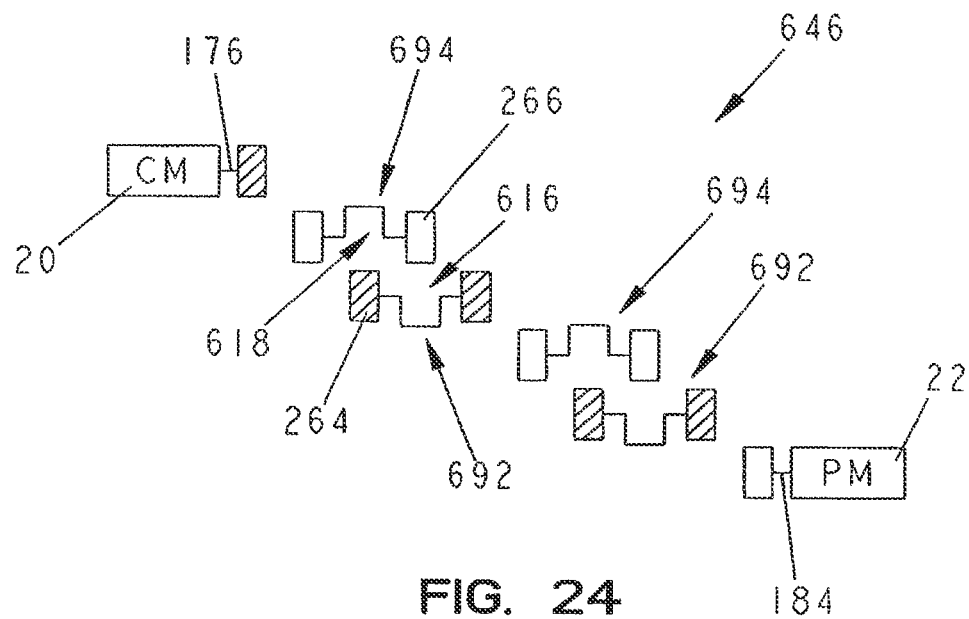
FIG. 24 is an end view taken along line 24-24 of FIG. 23 showing the relative position of the ends of the links of FIG. 23 when the series is partially extended.
Figure 25:
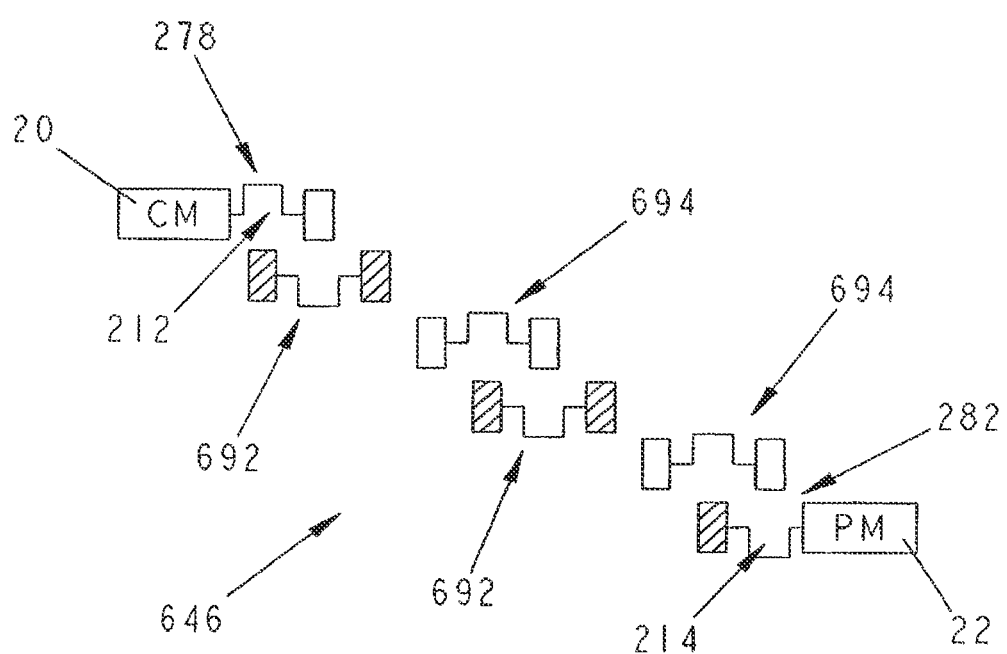
FIG. 25 is a view similar to FIG. 24 taken along line 24-24 of FIG. 23.

Multiple alternative link and coupler configurations are provided for positioning the scissor pairs in a side-by-side relationship. For example, in FIGS. 11-13, notched first and second link couplers 292, 294' that provide clearance for respective second and first links 266, 264 are shown. Second link couplers 394 that extend around the ends of first links 264, as shown in FIG. 14, and additional notched first couplers 292 are provided in another alternative embodiment. As shown in FIGS. 17-19, an alternative arrangement of first links 164, 464 and second links 166, 466 is provided with first and second link couplers 492, 494 than span intermediate second and first links 164, 464, 166, 466. Another alternative embodiment, shown in FIGS. 20-22, provides alternating first and second links 264, 566, first link couplers 492 that span single intermediate second links 566, and second link couplers 594 that span single intermediate first links 264. As shown in FIGS. 23-25, according to another alternative embodiment, notched first and second links couplers 692, 694 are provided that span single second and first links 264, 266. Another alternative embodiment, shown in FIGS. 26-29, provides pairs of first and second links 164, 166 with intermediate first and second links 164, 166 positioned therebetween and pair couplers 768 that span intermediate first and second links 164, 166 to couple the respective first and second links 164, 166 together.

Figure 11:
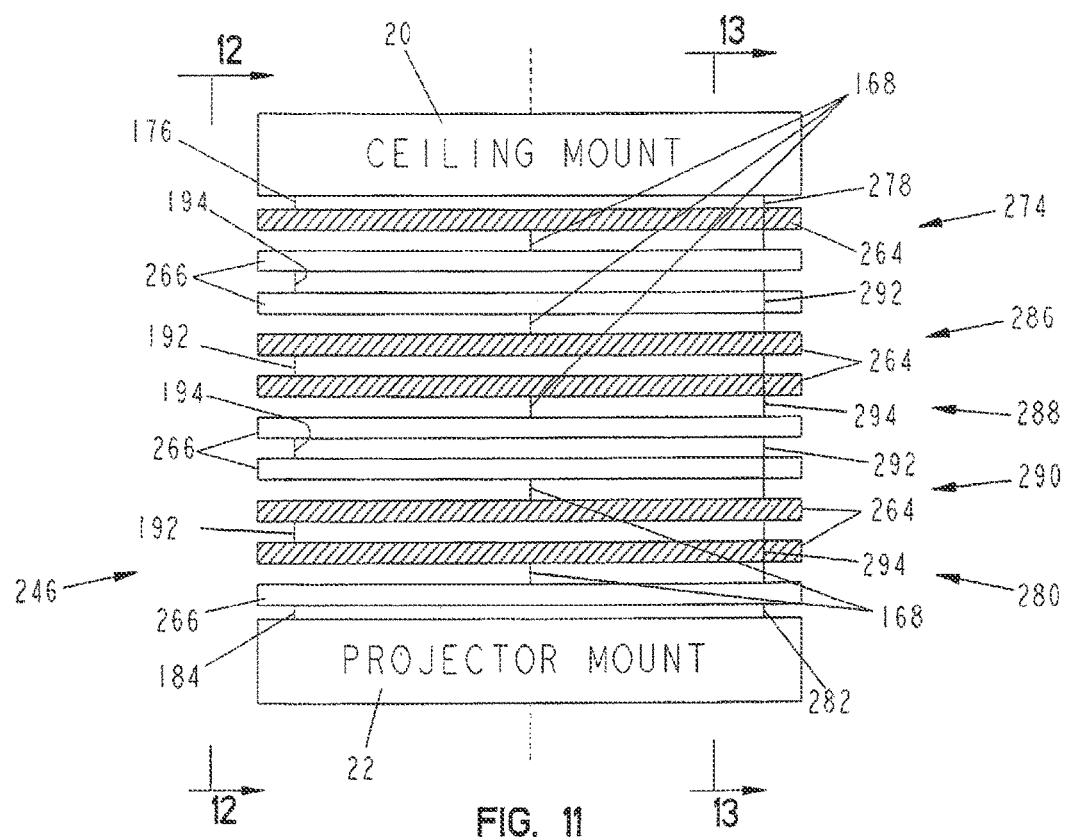
FIG. 11 is a view similar to FIG. 6 showing a first alternative embodiment arrangement of links and couplers configured to couple the links together showing the ends of the links aligned.
Figure 12:
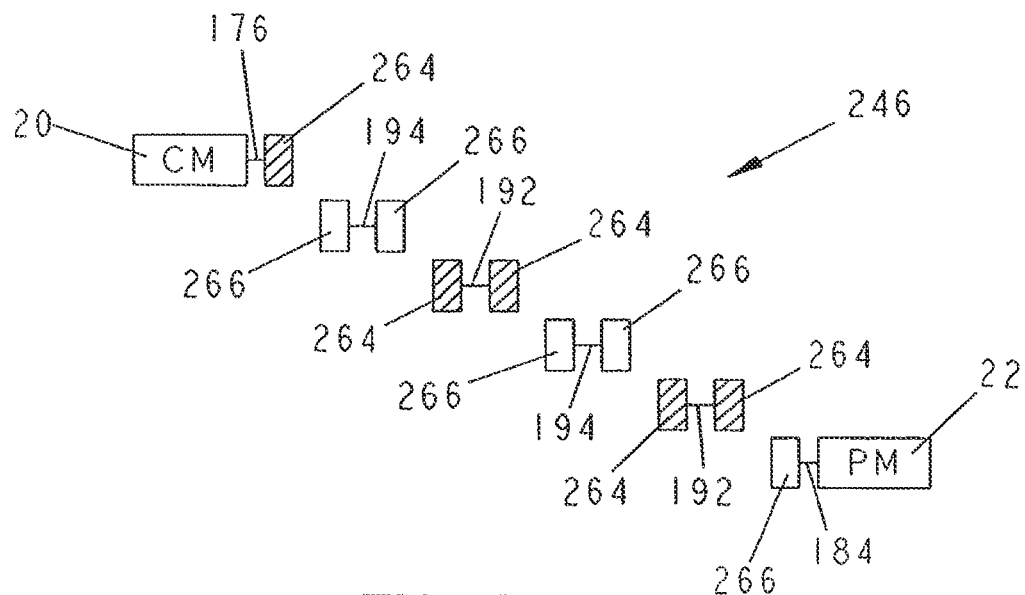
FIG. 12 is an end view taken along line 12-12 of FIG. 11 showing the relative position of the ends of the links of FIG. 14 when the series is partially extended.
Figure 13:
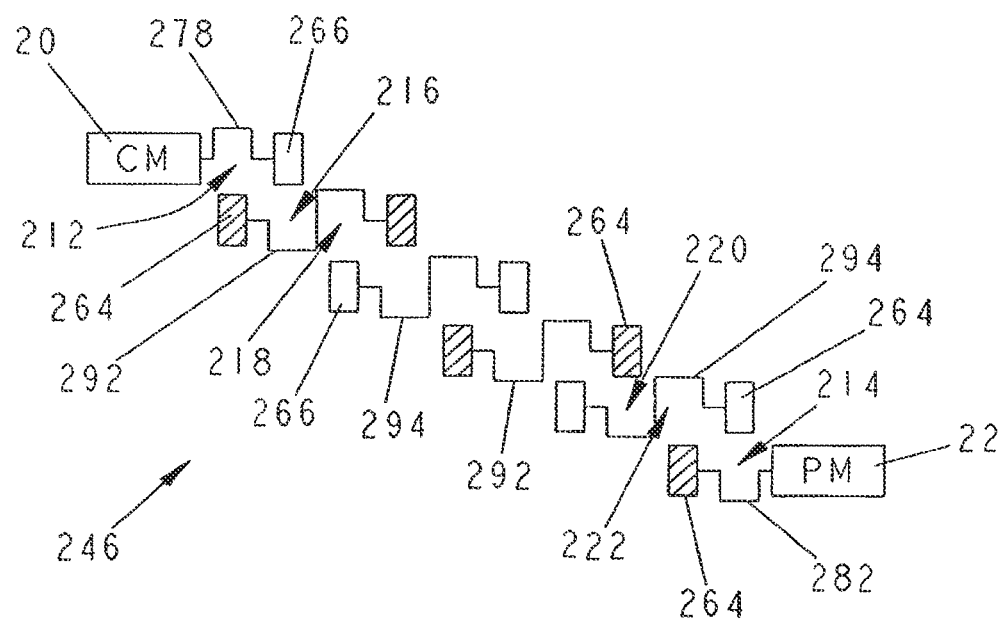
FIG. 13 is a view similar to FIG. 12 taken along line 13-13 of FIG. 11 showing some of the couplers including notches to provide clearance for the intermediate links that they span.
Figure 14:
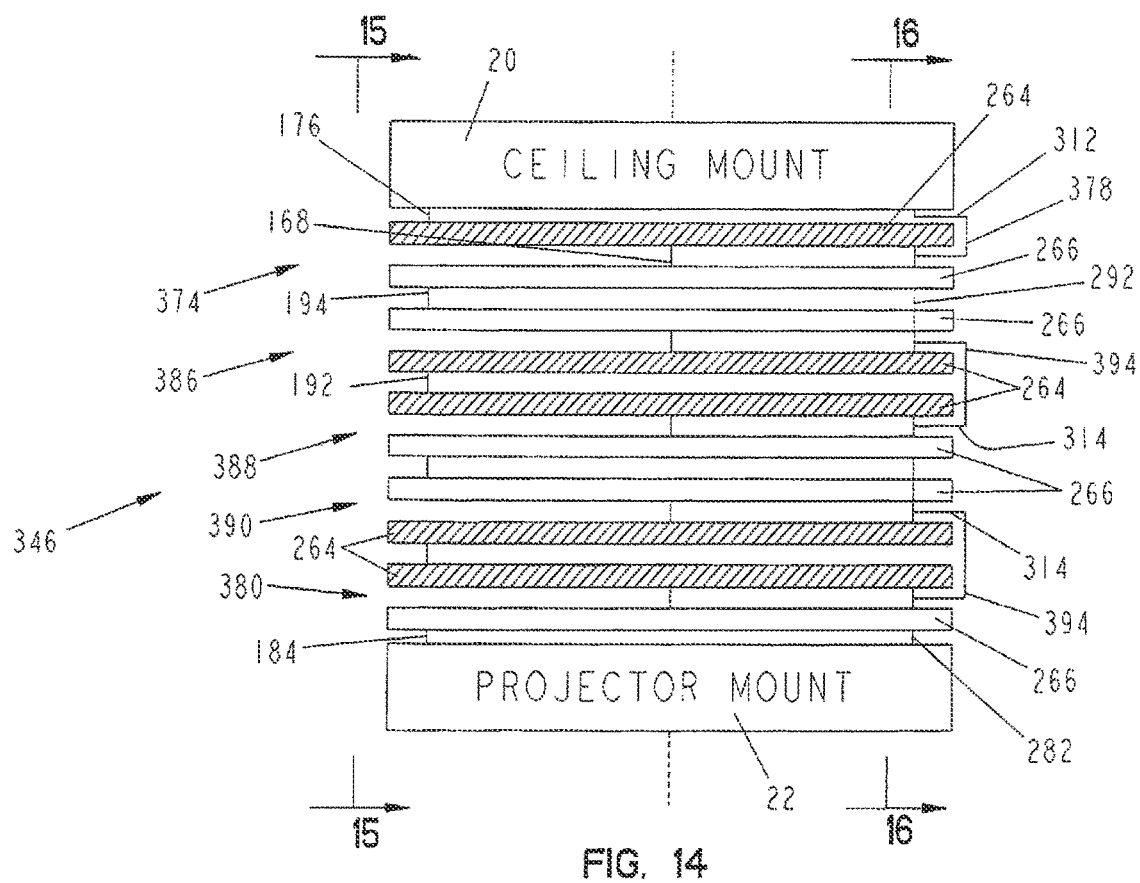
FIG. 14 is a view similar to FIG. 6 showing a second alternative embodiment arrangement of links and couplers configured to couple the links together showing some of the couplers extending around the ends of intermediate links.

According to a first alternative embodiment of the present disclosure, a series 246 is provided including a plurality of first and second links 264, 266 as shown in FIGS. 11-13. Respective couplers 168, 176, 278, 282, 184, 192', 292, 194, 294' are also provided that couple links 264, 266 together and to mounts 20, 22.

As shown in FIG. 11, first links 264 and second links 266 alternate in pairs in their position relative to ceiling mount 20. Mount coupler 176 couples first link 264 of first pair 274 to mount 20 without spanning a second link 266. Mount coupler 278 spans first link 264 of first pair 274 to pivotably couple second link 266 of first pair 274 to mount 20. Mount coupler 282 spans second link 264 of last pair 280 to couple first link 264 of last pair 280 to projector mount 22. Mount coupler 184 couples second link 264 to mount 22 without spanning a first link 264.

A plurality of pair couplers 168 couple the respective first and second links 264, 266 of scissor pairs 262 together. As shown in FIG. 11, pair couplers 168 are positioned at the midpoints of links 264, 266.

As shown in FIG. 11, first link couplers 292, 192' extend between and couple respective first links 264 together. First link coupler 292 completely spans second links 266 of first and second pairs 274, 286 to couple first link 264 of first pair 274 to first link 264 of second pair 286. First link coupler 192' couples first link 264 of second pair 286 to first link 264 of third pair 288 without spanning any intermediate second links 266. This pattern of coupling first links 264 continues until first link 264 of fifth pair 280.

Second link couplers 194, 294' extend between and couple respective second links 266 together. Second link coupler 194 couples second link 266 of first pair 274 to second link 266 of second pair 286 without spanning any intermediate first links 264. Second link coupler 294' completely spans first links 264 of second and third pairs 286, 288 to couple second link 266 of second pair 286 to second link 266 of third pair 288. This pattern of coupling second links 266 continues until second link 266 of fifth pair 280.

As shown in FIG. 13, mount coupler 278 includes a downwardly facing notch 212 sized to receive first link 264 of first pair 274. Similarly, mount coupler 282 includes an upwardly facing notch 214 sized to receive second link 264 of fifth pair 280. First link couplers 292 include upwardly facing notches 216 and downwardly facing notches 218 sized to receive respective second links 266. Similarly, second link couplers 294' include upwardly facing notches 220 and downwardly facing notches 222 sized to receive respective first links 264. Notches 212, 214, 216, 218, 220, 222 are positioned to receive respective first and second links 264, 266 to provide clearance therefor so that first and second links 264, 266 of scissor pairs 262 can more fully collapse. According to an alternative embodiment of the present disclosures, the links are also provided with notices to receive the notched couplers of the various embodiments disclosed.

When series 226 is collapsed, first and second links 264, 266 are substantially at the same level. Thus, notches 212, 214, 216, 218, 220, 222 provide another way of permitting couplers to span one or more intermediate first or second link 264, 266 by passing couplers over and/or under first and second links 264, 266. According to alternative embodiments of the present disclosure, notches in the couplers are not provided.

Figure 15:
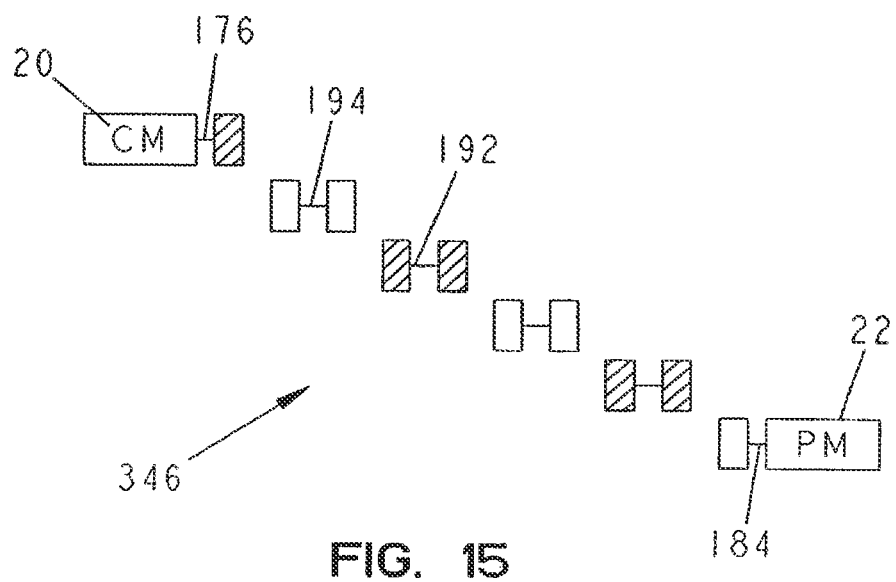
FIG. 15 is an end view taken along line 15-15 of FIG. 14 showing the relative position of the ends of the links of FIG. 16 when the series is partially extended.
Figure 16:
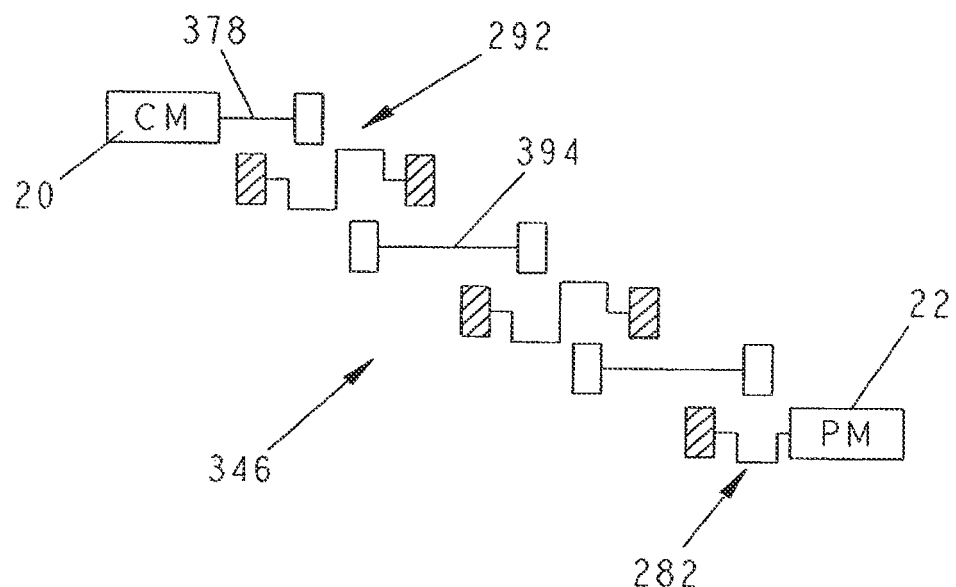
FIG. 16 is a view similar to FIG. 15 taken along line 16-16 of FIG. 14.

According to a second alternative embodiment of the present disclosure, a series 346 is provided including a plurality of first and second links 264, 266 as shown in FIGS. 14-16. Respective couplers 168, 176, 378, 282, 184, 192', 292, 194, 394 are also provided that couple links 264, 266 together and to mounts 20, 22.

As shown in FIG. 14, first links 264 and second links 266 alternate in pairs in their position relative to ceiling mount 20. Mount coupler 176 couples first link 264 of first pair 274 to mount 20 without spanning a second link 266. Mount coupler 378 completely spans first link 264 of first pair 274 to pivotably couple second link 266 of first pair 274 to mount 20. Mount coupler 282 spans second link 264 of last pair 280 to couple first link 264 of last pair 280 to projector mount 22. Mount coupler 184 couples second link 264 to mount 22 without spanning a first link 264.

First link couplers 192', 292 of series 346 are arranged identically to first link couplers 192', 292 of series 246 as described above. Second link couplers 194, 394 extend between and couple second links 266 together. Second link coupler 194 couples second link 266 of first pair 274 to second link 266 of second pair 286 without spanning any intermediate first links 264. Second link coupler 394 spans first links 264 of second and third pairs 286, 288 to couple second link 266 of second pair 286 to second link 266 of third pair 288. This pattern of coupling second links 266 continues until fifth pair 280.

As shown in FIG. 14, mount coupler 378 includes an inwardly facing notch 312 sized to receive an end of first link 264 of first pair 274. Similarly, second link couplers 394 include inwardly facing notches 314 sized to receive a pair of respective first links 264. Notches 312, 314 are positioned to receive respective first and second links 264, 266 to provide clearance therefor so that first and second links 264, 266 of scissor pairs 262 can more fully collapse.

When series 326 is collapsed, first and second links 264, 266 are at substantially the same level. Thus, notches 312, 314 provide another way of permitting couplers to span one or more intermediate first or second link 264, 266 by extending couplers around the ends of first links 264. According to alternative embodiments of the present disclosure, notches are not provided.

According to a third embodiment of the present disclosure, a series 446 is provided including a plurality of first and second links 164, 464, 166, 466 as shown in FIGS. 17-19. Respective couplers 168, 176, 178, 182, 184, 492, 494 are provided that couple links 164, 464, 166, 466 together and to mounts 20, 22.

As shown in FIG. 17, first links 164, 464, and second links 166, 466 alternate in their position relative to ceiling mount 20. Mount coupler 176 couples first link 464 of first pair 474 to mount 20 without spanning a second link 166, 466. Mount coupler 178 spans first link 464 of first pair 474 to pivotably couple second link 466 of first pair 474 to mount 20. Mount coupler 182 spans second link 464 of last pair 480 to couple first link 464 of last pair 480 to projector mount 22. Mount coupler 184 couples second link 464 to mount 22 without spanning a first link 164, 464.

A plurality of pair couplers 168 couple the respective first and second links 164, 464, 166, 466 of scissor pairs 462 together. As shown in FIG. 17, pair couplers 168 are offset from midpoints of links 164, 464, 166, 466 so that the length of each link 164, 464, 166, 466 on either side of the respective pair couplers 168 is different. For example, more of first link 464 of first pair 474 is positioned to the left of pair coupler 168 than is positioned to the right of pair coupler 168. Similarly, more of second link 466 of first pair 474 is positioned to the right of pair coupler 168 than is positioned to the left of pair coupler 168.

As shown in FIG. 17, first link couplers 492 extend between and couple respective first links 464, 164 together. One first link coupler 492 spans second link 466 of first pair 474 to couple first link 464 of first pair 474 to first link 164 of second pair 186. Another first link coupler 492 spans second link 166 of second pair 186 to couple first link 164 of second pair 186 to first link 464 of third pair 488. This pattern of coupling first links 164, 464 continues until first link 464 of fifth pair 480.

Second link couplers 494 extend between and couple respective second links 166, 466 together. One second link coupler 494 spans first link 164 of second link pair 186 to couple second link 466 of first pair 474 to second link 166 of second pair 186. Another second link coupler 494 spans first link 464 of third pair 488 to couple second link 166 of second pair 186 to second link 466 of third pair 488. This pattern of coupling second links 166, 466 continues until second link 466 of fifth pair 480.

Similar to the preferred embodiment shown in FIGS. 8-10, second link 166 of second pair 186 includes a notch 112 on a bottom side 114 thereof. Notch 112 is positioned to receive first link coupler 492 to provide clearance therefor so that first links 164, 464 of second and third 186, 374 can more fully collapse. Therefore, when series 446 is collapsed, first links 164, 464 of second and third pairs 186, 488 are at substantially the same level as second link 166 of second pair 186. Second link 166 of fourth pair 490 also includes a notch 112.

First link 464 of first pair 474 includes a notch 412 on a top side 416 thereof. This notch 412 is positioned to receive mount coupler 178 to provide clearance therefor so that first and second pairs 474, 186 can more fully collapse. Notches 412 are also provided on top sides 416 of first links 464 of third and fifth pairs 488, 480 to provide clearance for respective second link couplers 494. Thus, notches 112, 412 provide another way of permitting couplers 492, 178, 494 to span one or more intermediate first or second links 464, 466 by passing couplers 492, 178, 494 through respective links 464, 466. According to alternative embodiments of the present disclosure, notches are not provided.

According to this embodiment of the present disclosure, the relative location of first and second links 464, 164, 466, 166 of scissor pairs 462, 162 and pair couplers 168 provides a way for couplers 494, 492 to span one or more intermediate second or first links 466, 164. As shown in FIG. 17, the location of couplers 494 on second links 466, 166 of first and second pairs 474, 186 is beyond the ends of first link 164 of second pair 186. Thus, a space 418 exists between coupler 494 and the ends of first link 164 of second pair 186 to provide clearance for first link 164 of second pair 186 to collapse.

The location of couplers 492 on first links 464, 164 of first and second pairs 474, 186 is beyond the ends of second link 466 of first pair 474. Thus, a space 418' exists between coupler 492 and the ends of second link 466 of first pair 486 to provide clearance for second link 466 of first pair 474 to collapse. Similarly, mount coupler 182 is spaced apart from second link 464 of fifth pair 480 to permit fifth pair 480 to collapse.

According to a fourth embodiment of the present disclosure, a series 546 is provided including a plurality of first and second links 264, 566, as shown in FIGS. 20-22. Respective couplers 168, 176, 378, 182, 184, 492, 594 are provided that couple links 264, 566 together and to mounts 20, 22.

As shown in FIG. 20, first links 264 and second links 566 alternate in their position relative to ceiling mount 20. Mount coupler 176 couples first link 264 of first pair 574 to mount 20 without spanning a second link 566. Mount coupler 378 spans first link 264 of first pair 574 to pivotably couple second link 566 of first pair 574 to mount 20. Mount coupler 182 spans second link 566 of last pair 580 to couple first link 264 of last pair 580 to projector mount 22. Mount coupler 184 couples second link 566 to mount 22 without spanning a first link 264. A plurality of pair couplers 168 couple the respective first and second links 264, 566 of scissor pairs 562 together.

As shown in FIG. 20, first link couplers 492 extend between and couple respective first links 264 together. One first link coupler 492 spans second link 566 of first pair 574 to couple first link 264 of first pair 574 to first link 264 of second pair 586. Another first link coupler 492 spans second link 566 of second pair 586 to couple first link 264 of second pair 586 to first link 264 of third pair 588. This pattern of coupling first links 264 continues until first link 264 of fifth pair 580.

Second link couplers 594 extend between and couple respective second links 566 together. One second link coupler 594 spans first link 264 of second link pair 586 to couple second link 566 of first pair 574 to second link 566 of second pair 586. Another second link coupler 594 spans first link 264 of third pair 588 to couple second link 566 of second pair 586 to second link 566 of third pair 588. This pattern of coupling second links 566 continues until second link 566 of fifth pair 580.

Similar to the preferred embodiment shown in FIGS. 8-10, each second link 566 includes a notch 512 on a bottom side 518 thereof. Notches 512 are positioned to receive first link couplers 492 to provide clearance therefor so that first links 264 can more fully collapse. For example, when series 546 is collapsed, first links 264 of second and third pairs 586, 588 are at substantially the same level as second link 566 of second pair 586.

Mount coupler 378 includes notch 312 and is substantially identical in form and function to mount coupler 378 of the second alternative embodiment shown in FIG. 13. As shown in FIG. 20, similar to mount coupler 378, second link couplers 594 include inwardly facing notches 514 sized to receive respective first links 264. Notches 312, 514 are positioned to receive respective first links 264 to provide clearance therefor so that first and second links 264, 566 of scissor pairs 562 can more fully collapse.

When series 546 is collapsed, first and second links 264, 566 are at substantially the same level. Thus, notches 512, 312, 514 provide another way of permitting couplers to span one or more intermediate first or second link 264, 266 by extending couplers through second links 566 and around first links 264. According to alternative embodiments of the present disclosure, notches are not provided.

According to a fifth embodiment of the present disclosure, a series 646 is provided including a plurality of first and second links 264, 266, as shown in FIGS. 23-25. Respective couplers 168, 176, 278, 282, 184, 692, 694 are provided that couple links 264, 266 together and to mounts 20, 22.

As shown in FIG. 23, first links 264 and second links 266 alternate in their position relative to ceiling mount 20. Mount coupler 176 couples first link 264 of first pair 274 to mount 20 without spanning a second link 266. Mount coupler 278 spans first link 264 of first pair 274 to pivotably couple second link 266 of first pair 274 to mount 20. Mount coupler 282 spans second link 266 of last pair 280 to couple first link 264 of last pair 280 to projector mount 22. Mount coupler 184 couples second link 262 to mount 22 without spanning a first link 264. A plurality of pair couplers 168 couple the respective first and second links 264, 266 of scissor pairs 262 together.

As shown in FIGS. 24 and 25, first link couplers 692 extend between and couple respective first links 264 together. One first link coupler 692 spans second link 266 of first pair 274 to couple first link 264 of first pair 274 to first link 264 of second pair 286. Another first link coupler 692 spans second link 266 of second pair 286 to couple first link 264 of second pair 286 to first link 264 of third pair 288. This pattern of coupling first links 264 continues until first link 264 of fifth pair 280.

Second link couplers 694 extend between and couple respective second links 266 together. One second link coupler 694 spans first link 264 of second pair 286 to couple second link 266 of first pair 274 to second link 266 of second pair 286. Another second link coupler 694 spans first link 264 of third pair 288 to couple second link 266 of second pair 286 to second link 264 of third pair 290. This pattern of coupling second links 266 continues until second link 266 of fifth pair 280.

As mentioned above, mount couplers 278, 282 include respective downwardly and upwardly facing notches 212, 214 sized to receive respective first and second links 264, 266 of respective first and fifth pairs 274, 280. Similarly, first link couplers 692 include upwardly facing notches 616 sized to receive second links 266 and second link couplers 694 include downwardly facing notches 618 sized to receive first links 264. Notches 212, 214, 616, 618 are positioned to receive respective first and second links 264, 266 to provide clearance therefor so that first and second links 264, 266 of scissor pairs 262 can more fully collapse.

When series 626 is collapsed, first and second links 264, 266 are at substantially the same level. Thus, notches 212, 214, 616, 618 provide another way of permitting couplers to span one or more intermediate first or second link 264, 266 by passing couplers over and/or under first and second links 264, 266. According to alternative embodiments of the present disclosure, notches are not provided.

According to a sixth embodiment of the present disclosure, a series 746 is provided including a plurality of first and second links 164, 166. Respective couplers 768, 168, 176, 778, 282, 184, 192, 192', 194, 194', 494 are provided that couple links 164, 166 together and to mounts 20, 22.

Figure 26:
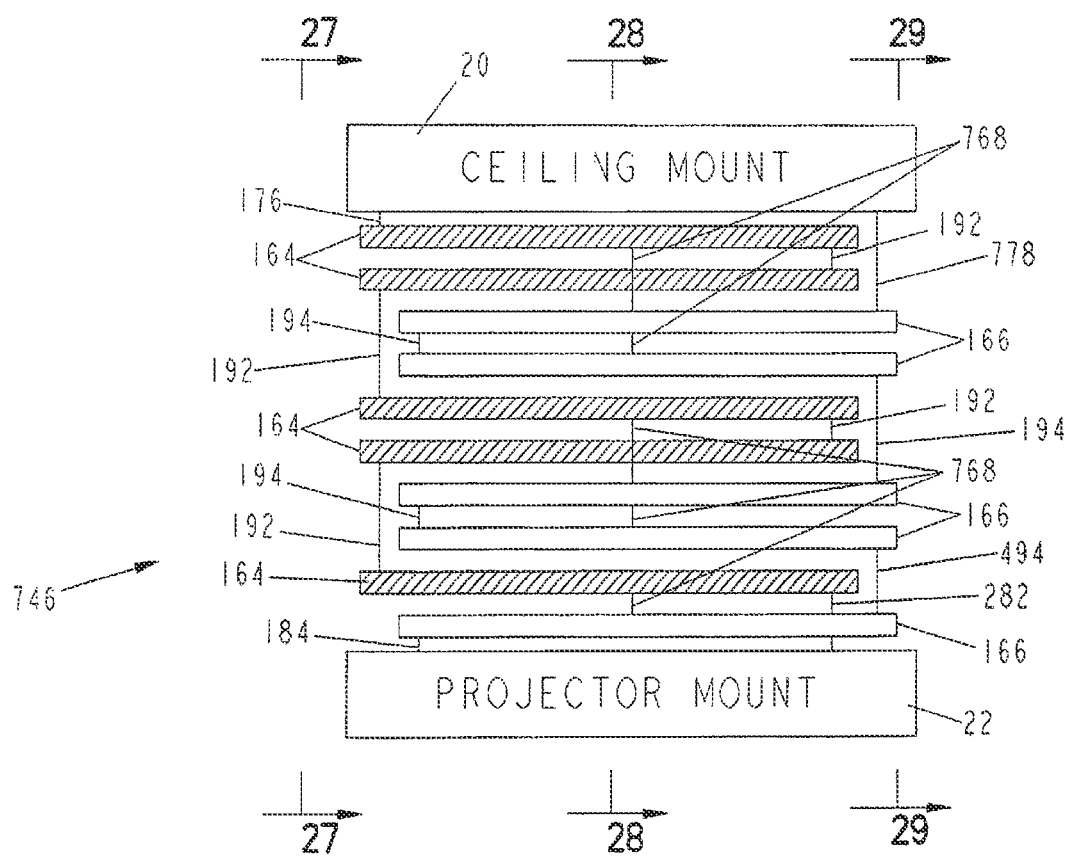
FIG. 26 is a view similar to FIG. 6 showing a sixth alternative embodiment arrangement of links and couplers configured to couple the links together showing the link pattern of FIG. 8 and some of the pair couplers spanning intermediate links.
Figure 27:
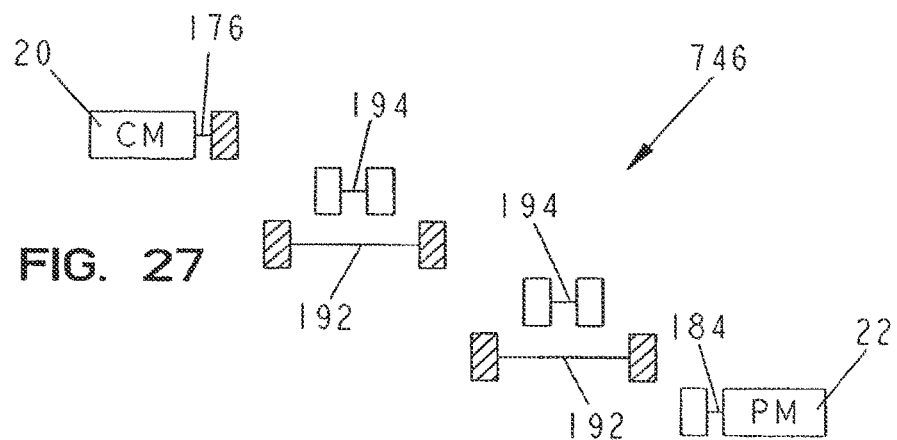
FIG. 27 is an end view taken along line 27-27 of FIG. 26 showing the relative position of the ends of the links of FIG. 26 when the series is partially extended.
Figure 28:
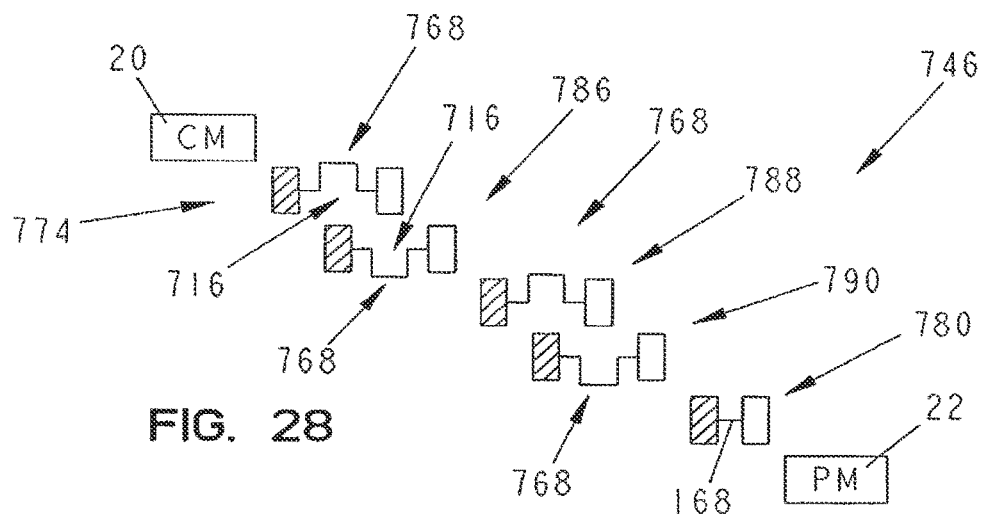
FIG. 28 is a sectional view taken along line 28-28 of FIG. 26 showing the relative position of the centers of the links of FIG. 27 when the series is partially extended.
Figure 29:
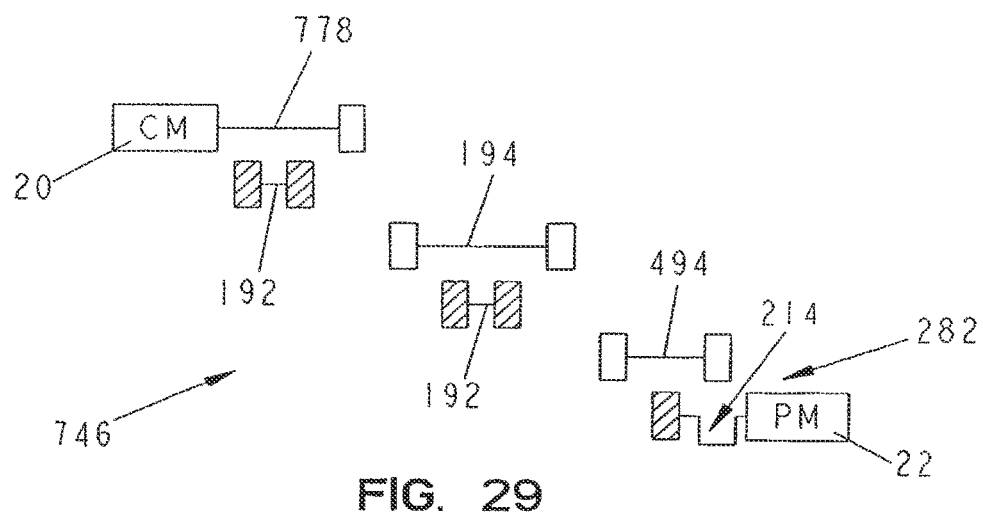
FIG. 29 is a view similar to FIG. 27 taken along line 29-29 of FIG. 26.

As shown in FIG. 26, first links 164 and second links 166 alternate in pairs in their position relative to ceiling mount 20. A link 164, 166 of an adjacent pair 762 is positioned between links 164, 166 of the same pair 762. For example, first link 164 of second pair 786 is positioned between first and second links 164, 166 of first pair 774. Similarly, second link 166 of first pair 774 is positioned between first and second links 164, 166 of second pair 786. This pattern continues until last pair 780 in which first and second pairs 164, 166 are positioned adjacent each other.

Mount coupler 176 couples first link 164 of first pair 774 to mount 20 without spanning a second link 166. Mount coupler 778 spans first links 164 of first and second pairs 774, 786 to pivotably couple second link 166 of first pair 774 to mount 20. Mount coupler 282 spans second link 164 of last pair 180 to couple first link 164 of last pair 780 to projector mount 22. Mount coupler 184 couples second link 164 to mount 22 without spanning a first link 164.

A plurality of pair couplers 768, 168 couple the respective first and second links 164, 166 of scissor pairs 762 together. As shown in FIG. 26, pair couplers 768, 168 are offset from midpoints of links 164, 166 so that the length of each link 164, 166 on either side of the respective pair couplers 768, 168 is different. For example, more of first link 164 of first pair 774 is positioned to the left of pair coupler 768 than is positioned to the right of pair coupler 768. Similarly, more of second link 166 of first pair 774 is positioned to the right of pair coupler 768 than is positioned to the left of pair coupler 768. Pair couplers 768 span intermediate links 164, 166 of adjacent scissor pairs 762. For example, pair coupler 768 of first pair 774 spans first link 164 of second pair 786 to couple first and second links 164, 166 of first pair 774 together. Pair coupler 168 of fifth pair 180 does not span an intermediate link 164, 166.

As shown in FIG. 26, first link couplers 192, 192' extend between and couple respective first links 164 together. First link coupler 192 spans second links 166 of first and second pairs 774, 786 to couple first link 164 of second pair 786 to first link 164 of third pair 788. First link coupler 192' couples first link 164 of first pair 774 to first link 164 of second pair 786 without spanning any intermediate second links 166. This pattern of coupling first links 164 continues until first link 164 of fifth pair 180.

Second link couplers 194, 194', 494 extend between and couple respective second links 166 together. Second link coupler 194 couples second link 166 of first pair 774 to second link 166 of second pair 786 without spanning any intermediate first links 164. Second link coupler 194' spans first links 164 of third and fourth pairs 788, 790 to couple second link 166 of third pair 188 to second link 166 of fourth pair 790. Second link coupler 494 spans first link 164 of fifth pair 180 to couple second link 166 of fourth pair 790 to second link 166 of fifth pair 180.

As mentioned above, mount coupler 282 includes an upwardly facing notch 214 sized to receive second link 166 of fifth pair 180. Similarly, pair couplers 768 include notches 716 sized to receive respective first and second links 164, 166. Notches 214, 716 are positioned to receive respective first and second links 164, 166 to provide clearance therefor so that first and second links 164, 166 of scissor pairs 762, 162 can more fully collapse.

The relative location of first and second links 164, 166 of scissor pairs 162 and pair couplers 768, 168 provides a way for couplers 778, 192, 194' to span one or more intermediate first links 164. As shown in FIG. 26, the location of coupler 194' on second links 166 of second and third pairs 786, 788 is beyond the ends of first links 164 of third and fourth pairs 788, 790. Thus, a space 118 exists between coupler 194' and the ends of first links 164 of third and fourth pairs 788, 790 to provide clearance for first links 164 of third and fourth pairs 788, 790 to more fully collapse. Similarly, mount coupler 778 and second link coupler 494 are spaced apart from first links 164 to permit first, second, and fifth pairs 774, 786, 180 to more fully collapse.

According to other alternative embodiments of the present disclosure, other configurations of links and couplers are provided. For example, according to one alternative embodiment of the present disclosure, the links have different overall lengths. According to another alternative embodiment, the couplers span three or more intermediate links. According to yet another embodiment, two or more links are positioned between links of the same scissor pair.

According to yet another embodiment of the present disclosure, a first portion of a series of scissor pairs are stacked side-by-side in a first direction and coupled to an end link and the remaining portion of the series is coupled to the end link and stacked side-by-side in a second direction opposite the first directions (i.e. a set of side-by-side scissor pairs are stacked on top of another set of side-by-side scissors). Therefore, the series of scissor pairs has a minimum retracted height equal to the sum of the heights of two links, but twice the extension of a single side-by-side stack of the same series width. According to another alternative embodiment of the present disclosure, the series of scissor pairs includes both scissor pairs that are stacked side-by-side and standard scissor pairs that are stacked on top of each other.

An audio/visual system 810 according to the preferred embodiment of the present disclosure is shown in FIGS. 30-41. System 810 includes a projector (not shown) and a projector lift 814. Lift 814 is configured to move the projector from a storage position to a use position where the projector shines an image on a projection screen (not shown) or other surface.

Figure 30:
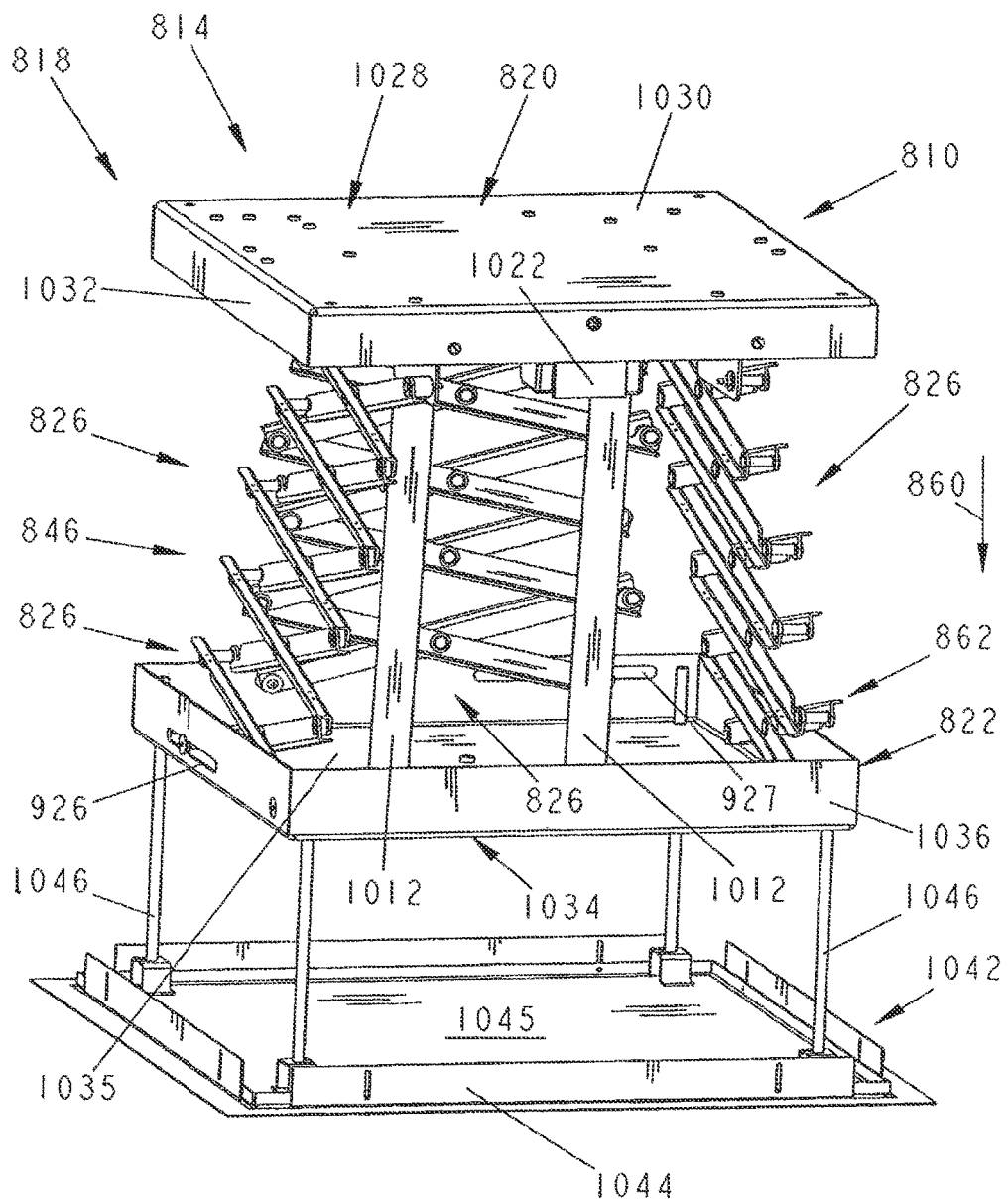
FIG. 30 is a perspective view of an alternative embodiment projector lift showing the projector lift in a slightly extended position.

As shown in FIG. 30, lift 814 includes a housing 818 having a ceiling mount 820 adapted to be coupled to the ceiling of the structure and a projector mount 822 adapted to support the projector. Lift 814 further includes a driver 824 that raises and lower projector mount 822 and the projector relative to ceiling mount 820 and the ceiling. Lift 814 further includes three stabilizers 826 that stabilize projector mount 822 during raising, lowering, and/or operation of the projector. According to alternative embodiments of the present disclosure, the mounts are incorporated into the building structure and projector.

The overall lengths of stabilizers 826 change as the projector is raised and lowered by driver 824. For example, when the projector is in the storage position (shown in FIGS. 34, 35, and 38), stabilizers 826 have a retracted length 828 (shown in FIG. 41) and when the projector is in the use position (shown in FIGS. 30, 31, and 36), stabilizers 826 have extended lengths 830 (shown in FIG. 39) that are greater than retracted length 828.

Lift 814 is preferably configured to lower the projector to a service position (shown in FIGS. 32, 33, and 37) where it is convenient to add or remove the projector from projector mount 822 for installation, service, or replacement. The service position is below the use position so that a service technician can install, service, or remove the projector while standing on the floor. To permit the projector to be lowered for servicing, stabilizer 826 must extend beyond length 830 to a further extended service length 832 (shown in FIG. 40) permitting a technician to install, remove, and/or repair the projector.

As mentioned above, the space between the lower ceiling surface and the ceiling structure is often limited. Therefore, if the projector is to be positioned totally within the ceiling, system 810 must have an overall height that will fit within the limited space. According to an alternative installation of the system, the lift is mounted on the ceiling surface or elsewhere so that the projector is positioned below the ceiling when in the retracted position.

Figure 39:
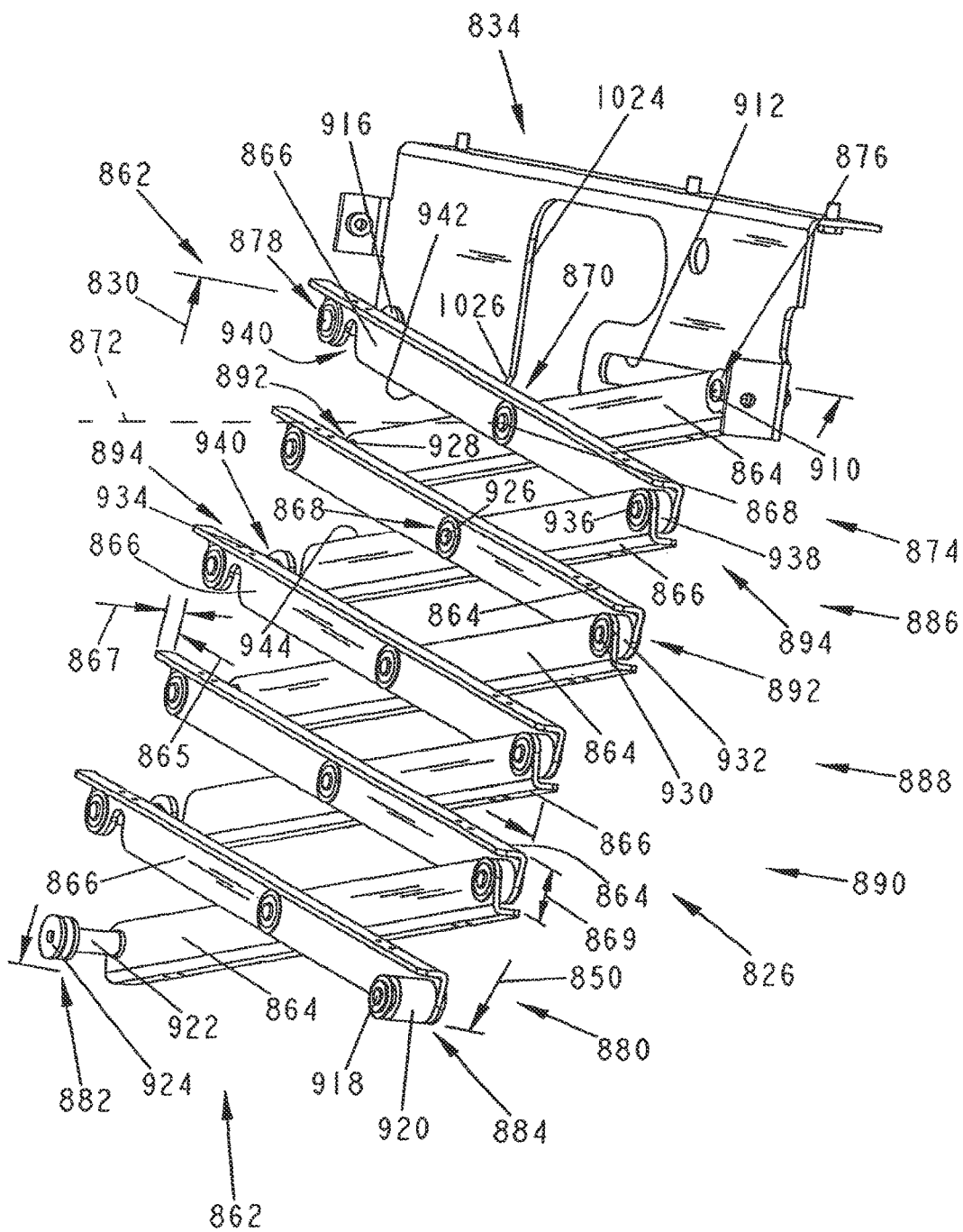
FIG. 39 is a perspective view of a bracket and stabilizer of the projector lift of FIG. 30 showing the stabilizer in a slightly extended position.
Figure 40:
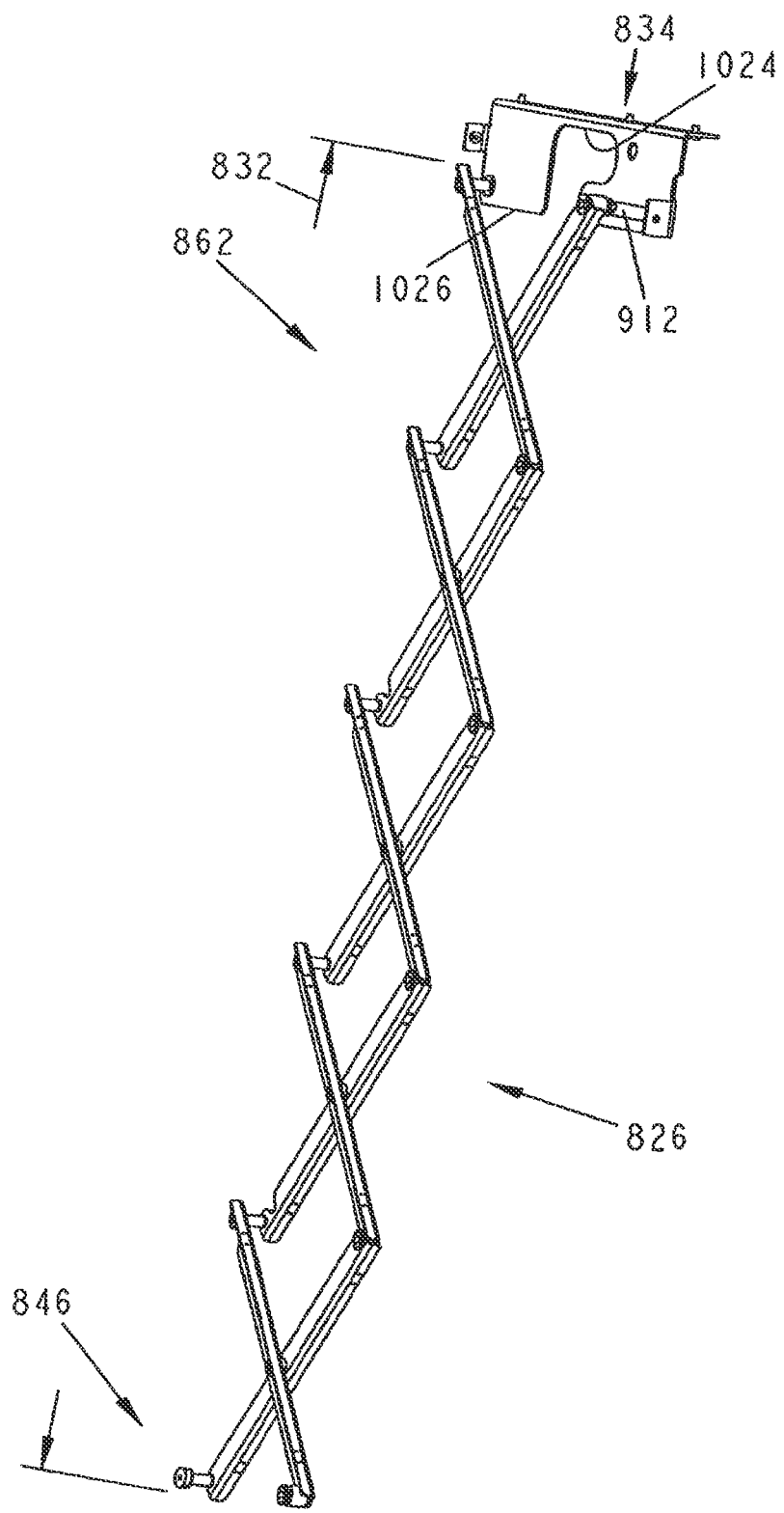
FIG. 40 is a perspective view of the bracket and stabilizer of the projector lift of FIG. 30 showing the stabilizer in a fully extended position.
Figure 41:
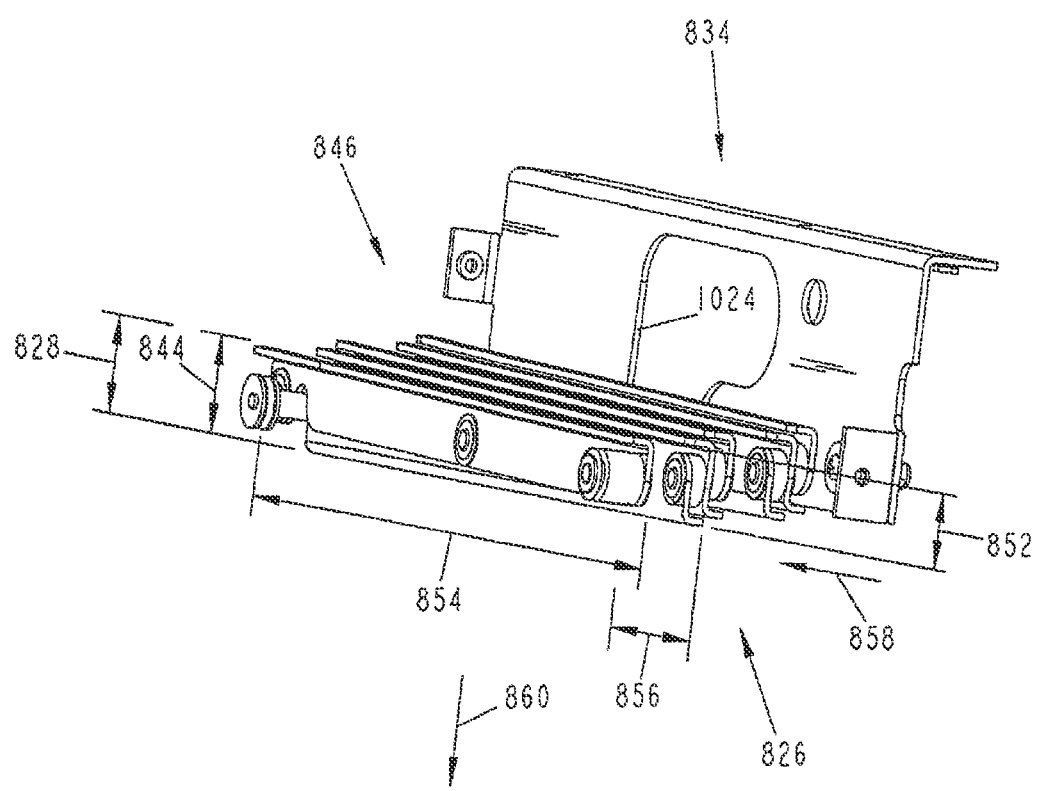
FIG. 41 is a perspective view of the bracket and stabilizer of the projector lift of FIG. 30 showing the stabilizer in a substantially retracted position.

As shown best in FIG. 39, each stabilizer 826 includes a series 846 of scissor pairs 862. Scissor pairs 862 cooperate to give series 846 an extended length 850 (shown in FIG. 39) and a retracted length 844 (shown in FIG. 41). Each scissor pair 862 has a minimum height 852, a maximum length 854, and a width 856 when fully retracted. When series 846 is substantially fully retracted, retracted length 844 of series 846 is slightly larger than height 852 of one of scissor pairs 862. Preferably, when series 846 is completely retracted, retracted length 844 is substantially equal to height 852.

Scissor pairs 862 are stacked side-by-side in a direction 858 that is lateral to a direction 860 of extension and retraction of series 846. Preferably, the addition of more scissor pairs 862 to the series increases the extended length of the stabilizers to permit lowering of the projector to an even lower service position, but does not increase the retracted length of the stabilizer.

Preferably, each scissor pair 862 includes a first link 864 and a second link 866 coupled to respective first link 864 by a pair coupler 868 at a pivot location 870 to pivot about a pivot axis 872 as shown in FIG. 39. Preferably, each first link 864 is positioned adjacent to respective second link 866 of the same scissor pair 862, but alternate in pairs so that first links 864 are adjacent to first links 864 of adjacent scissor pairs 862 and second links 866 are adjacent to second links 866 of adjacent scissor pairs 862. See, for example, FIG. 8.

Each first link 864 has a fixed length 865, a fixed width 867, and a fixed height 869. Similarly, each second link 864 has similar fixed dimensions. Retracted length 844 of series 846 is less than the sum of heights 869 of first links 864. The sum of heights 869 equals the number of first links 864 times height 869. Because the preferred embodiment includes five scissor pairs 862, the sum of heights 869 is equal to five times height 869 which is greater than retracted length 844 of series 846. Similarly, the sum of heights 852 of scissor pairs 862 is greater than the retracted length 844 of series 846.

First and second links 864, 866 of a first pair 874 are preferably coupled to fixed link or bracket 834, 836 of ceiling mount 820 by respective ceiling mount couplers 876, 878. Similarly, first and second links 864, 866 of a fifth or last pair 880 are preferably coupled to projector mount 822 by respective projector mount couplers 882, 884. First links 864 of intermediate pairs 886, 888, 890 are coupled to one another by first link couplers 892 and second links 866 of intermediate pairs 886, 888, 890 are coupled to one another by second link couplers 894.

Mount coupler 876 couples first link 864 of first pair 874 to brackets 834, 836 without spanning a second link 866. Mount coupler 878 spans first link 864 of first pair 874 to pivotably couple second link 866 of first pair 874 to brackets 834, 836. Mount coupler 882 spans second link 866 of last pair 880 to couple first link 864 of last pair 880 to projector mount 822. Mount coupler 884 couples first link 864 to mount 822 without spanning a second link 866.

Mount coupler 876 includes a pin 910, a roller (not shown) configured to ride in a slot 912, 913 formed in brackets 834, 836 and a spacer (not shown) positioned around pin 910 between first link 864 and brackets 834, 836. The ends of pin 910 are swaged to couple pin 910 to the roller and first link 864. Mount coupler 878 includes a pin 916 with ends that are swaged to couple pin 916 to second links 866. Mount coupler 884 includes a pin 918 and spacer 920 positioned around pin 918 between second link 866 of fifth pair 880 and projector mount 822. The ends of pin 918 are swaged to couple pin 918 to second link 866 and projector mount 822. Mount coupler 882 includes a pin 922 and roller 924 configured to ride in slots 926, 927 formed in projector mount 822. Ends of pin 922 are swaged to couple roller 924 to pin 922 and pin 922 to first link 864 of fifth pair 880.

A plurality of pair couplers 868 couple the respective first and second links 864, 866 of scissor pairs 862 together. Coupler 868 includes a pin 926 and a spacer (not shown) positioned around pin 926 between first and second links 864, 866. The ends of pin 926 are swaged to couple pins 926 to first and second links 864. Pair couplers 868 are offset from midpoints of links 864, 866 so that the length of each link 864, 866 on either side of the respective pair couplers 868 is different. See, for example, FIG. 8.

As shown in FIG. 39, first link couplers 892, 892' extend between and couple respective first links 864 together. First link coupler 892 spans second links 866 of first and second pairs 874, 886 to couple first link 864 of first pair 874 to first link 864 of second pair 886. First link coupler 892' couples first link 864 of second pair 886 to first link 864 of third pair 888 without spanning any intermediate second links 866. This pattern of coupling first links 864 continues until first link 864 of fifth pair 880.

First link coupler 892 includes a pin 928 that is swaged at both ends to couple pin 928 to first links 864. First link coupler 892' includes a pin 930 and a spacer 932 positioned around pin 930 between first links 864. Pin 930 is swaged at both ends to couple pin 930 to first links 864.

Second link couplers 894, 894' extend between and couple respective second links 866 together. Second link coupler 894 couples second link 866 of first pair 874 to second link 866 of second pair 886 without spanning any intermediate first links 864. Second link coupler 894' spans first links 864 of second and third pairs 886, 888 to couple second link 866 of second pair 886 to second link 866 of third pair 888. This pattern of coupling second links 866 continues until second link 866 of fifth pair 880.

Second link coupler 894' includes a pin 934 that is swaged at both ends to couple pin 934 to second links 866. Second link coupler 894 includes a pin 936 and a spacer 938 positioned around pin 936 between second links 866. Pin 936 is swaged at both ends to couple pin 936 to first links 866.

According to alternative embodiments of the present disclosure, other couplers are provided. For example, according to one embodiment, a bang rivet is used. According to other embodiments, other couplers such as other types of rivets, bolts, screws, or other couplers known to those of ordinary skill in the art are provided.

As shown in FIG. 39, second link 866 of first pair 874 includes a notch 940 on a bottom side 942 thereof. Notch 940 is positioned to receive first link coupler 892 to provide clearance therefor so that first links 864 of first and second pairs 874, 886 can more fully collapse. Therefore, when series 846 is fully collapsed, first links 864 of first and second pairs 874, 886 are at substantially the same level as second link 866 of first pair 874.

Second link 866 of second pair 886 includes a notch 940 on a top side 944 thereof. This notch 940 is also positioned to receive first link coupler 892 to provide clearance therefor so that second and third pairs 886, 888 can more fully collapse. Notches 940 are also provided on bottom sides 942 of second links 866 of third and fifth pairs 888, 880 and on top sides 944 of second link 866 of fourth pair 890. Thus, notches 940 provide one way of permitting couplers 892 to span one or more intermediate second links 866 by passing couplers 892 through respective second links 866. According to alternative embodiments of the present disclosure, notches are provided having other shapes, such as a V-shape, or other configurations that provide full or partial clearance for the couplers. According to alternative embodiments of the present disclosure, notches are not provided.

According to the preferred embodiment of the present disclosure, the relative location of first and second links 864, 866 of scissor pairs 862 and pair couplers 868 provides a way for couplers 894' to span one or more intermediate first links 864. The location of coupler 894' on second links 866 of first and second pairs 874, 886 is beyond the ends of first links 864 of second and third pairs 886, 888. Thus, a space exists between coupler 894' and the ends of first links 864 of second and third pairs 886, 888 to provide clearance for first links 864 of second and third pairs 886, 888 to more fully collapse. Similarly, mount coupler 878 is spaced apart from first link 864 of first pair 874 to permit first pair 874 to more fully collapse.

According to the preferred embodiment of the present disclosure, the links and couplers are made of steel. According to alternative embodiments of the present disclosure, the links and couplers are made of other materials such as other metals, plastics, wood, composites, or other materials known to those of ordinary skill in the art. According to another alternative embodiment of the present disclosure, the couplers are integral with the links. According to other alternative embodiments, other couplers and/or link arrangements known to those of ordinary skill in the art are provided with or without notches that completely or partially span intermediate links.

Figure 31:
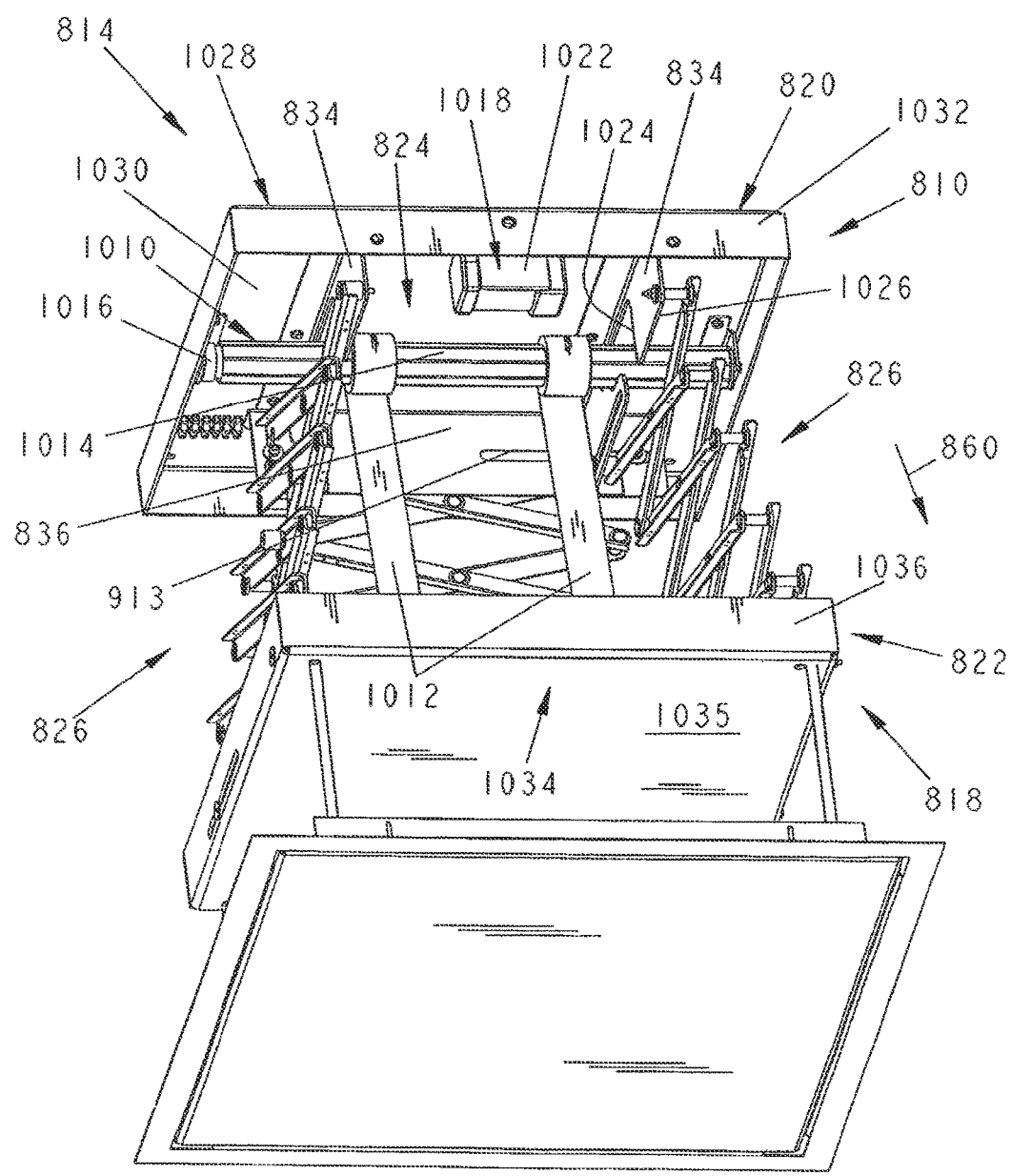
FIG. 31 is another perspective view of the projector lift of FIG. 30.
Figure 32:
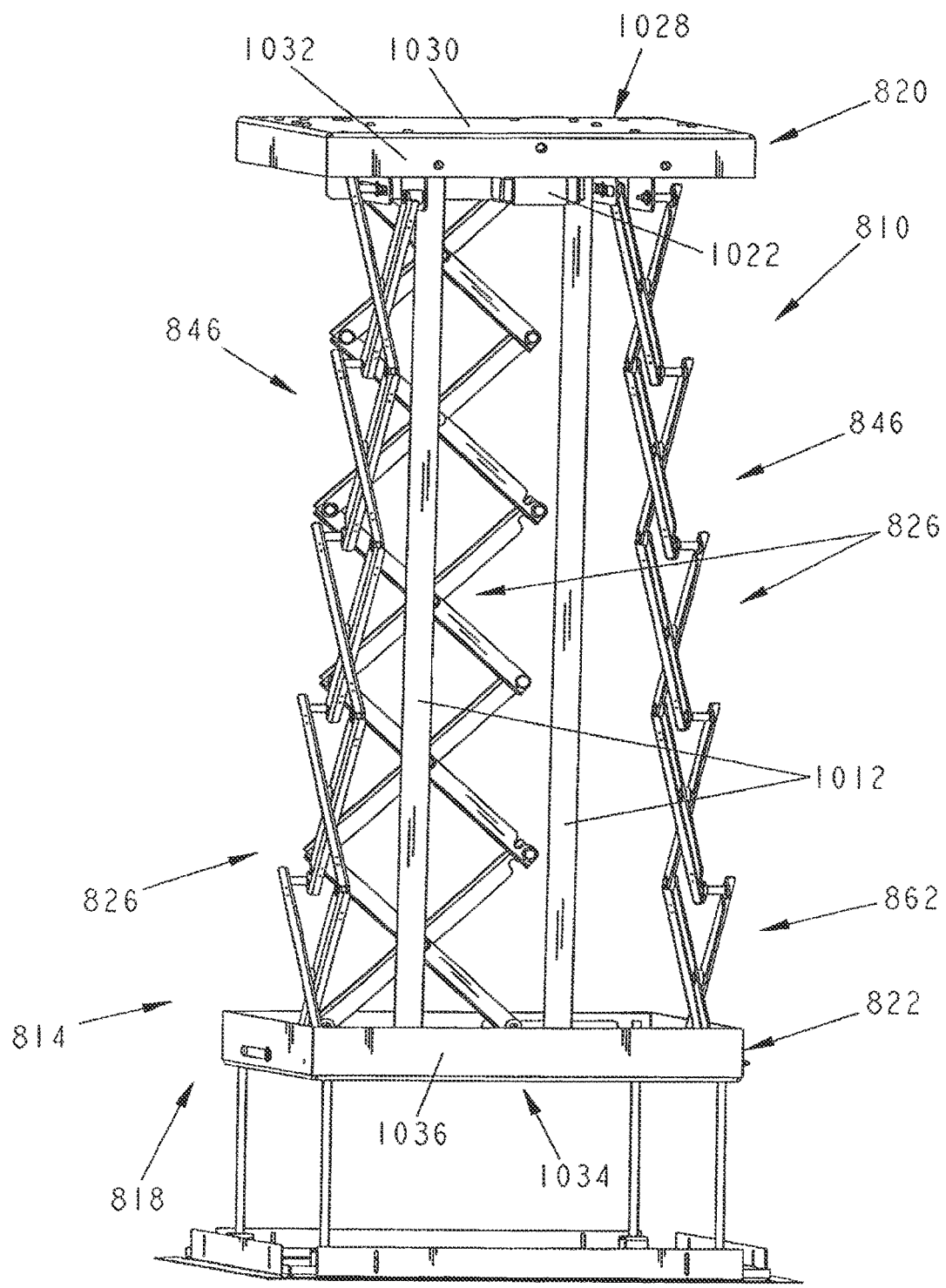
FIG. 32 is a perspective view of the projector lift of FIG. 30 showing the projector lift in a fully extended position.
Figure 33:
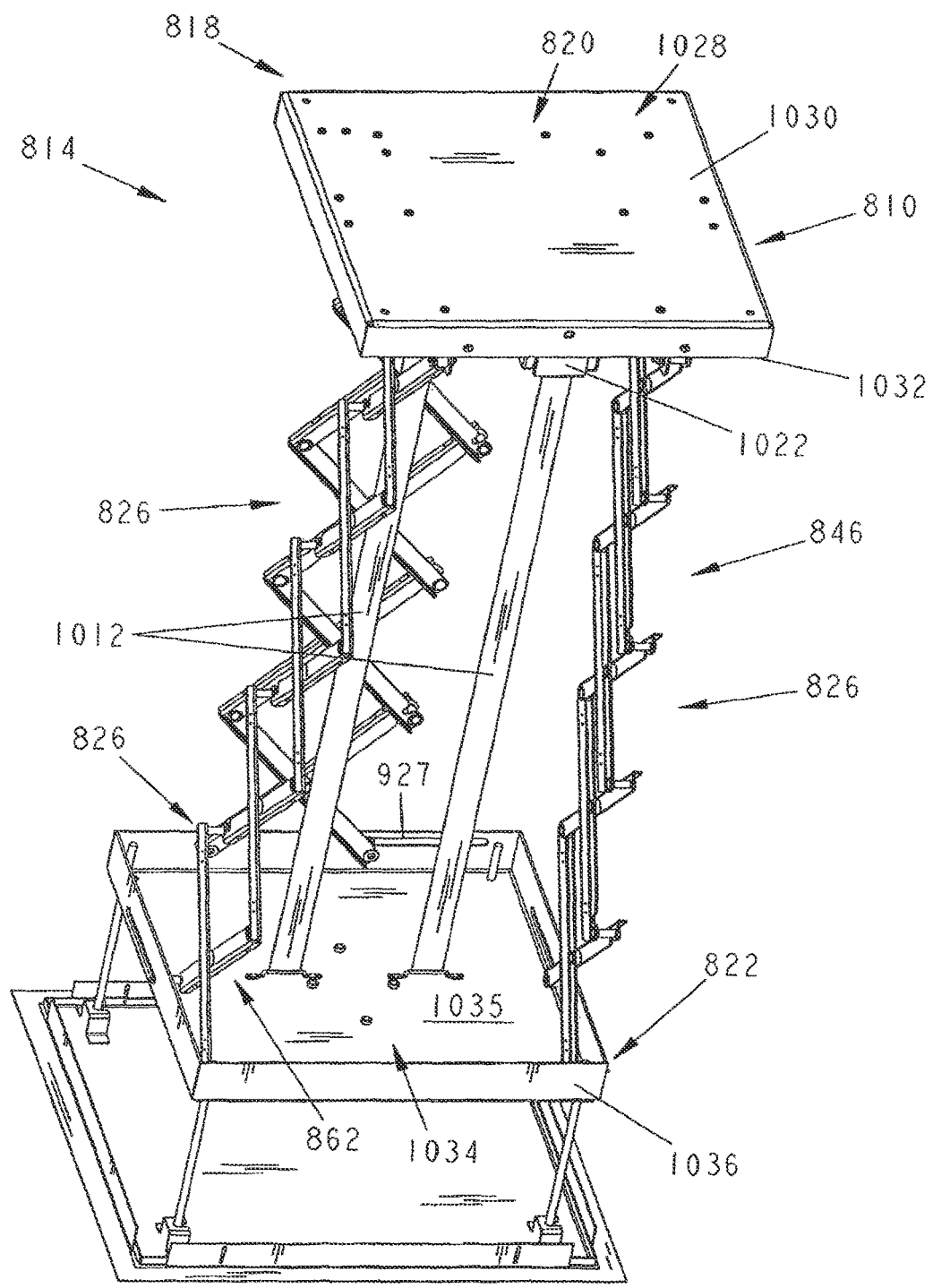
FIG. 33 is another perspective view of the projector lift of FIG. 30 showing the projector lift in the fully extended position.

As shown best in FIG. 31, driver 824 includes a tubular motor 1010 and a pair of straps 1012 coupled to tubular motor 1012 and projector mount 822. Tubular motor 1010 includes a tubular shaft 1014 and an electric motor 1016 at least partially positioned in an interior region of tubular shaft 1014. Additional details of suitable tubular motors are provided in U.S. Pat. No. 6,137,629, titled Projection Screen System with Circuitry for Multi-stage Installation, and U.S. Pat. No. 4,159,162, titled Silencer for Electric Motion Picture Screens, the disclosures of which are expressly incorporated by reference herein.

To extend projector lift 812, tubular motor 1010 unwraps straps 1012 so that gravity pulls projector mount 822 and the projector down. Similarly, to raise the projector, tubular motor 1010 rotates in an opposite direction to wrap straps 1012 over themselves. As shown in FIG. 31, the portion of straps 1012 being wrapped remains in substantially the same longitudinal position as tubular motor rotates.

According to the present disclosure, a speed control 1018 is provided to prevent projector mount 822 from dropping faster than a predetermined speed. Speed control 1020 includes a centripetal clutch 1022 and a strap (not shown) that extends from clutch 1022 to projector mount 822. If projector mount 822, and thus the strap, begins to drop too fast, centripetal clutch 1022 brakes or stops movement of the strap to resist downward movement of projector mount 822 and the projector coupled thereto.

As shown in FIG. 31, the ends of tubular motor 1010 are coupled to ceiling mount 820. Each bracket 834 includes an aperture 1024 sized to receive tubular shaft 1014 of tubular motor 1010. Apertures 1024 are formed in lower edges 1026 of brackets 834. If motor 1010 needs to be removed for repair or replacement, the ends of motor 1010 are uncoupled from ceiling mount 820 and motor 1010 is removed from apertures 1024. According to alternative embodiments, the driver motor is coupled to the projector mount.

According to the alternative embodiments of the present disclosure, other drivers known to those of ordinary skill in the art are provided. For example, according to one embodiment, a cable and drum arrangement is provided, such as that shown in U.S. Pat. No. 5,366,203 to Huffman, the disclosure of which is expressly incorporated by reference herein. According to other embodiments, chain drives, linear alternators, or other drivers known to those of ordinary skill in the art are provided. According to one embodiment of the present disclosure, the driver, such as a linear actuator, is coupled to the stabilizer and moves at least one link of the stabilizer causing extension and retraction of the stabilizer to raise and lower the projector.

Brackets 834, 836 are preferably coupled to an upper pan 1028 of ceiling mount 820. Upper pan 1028 opens downwardly and includes a mount wall 1030 normally coupled to the ceiling structure and a rectangular perimeter wall 1032 in which slots 926, 927 are formed. Because pan 1028 opens downwardly, the components positioned therein, such as motor 1010 and stabilizer 1026, can be accessed by a technician from below. According to the present disclosure, if additional scissor pairs are added to the series of scissor pairs, the brackets are moved inwardly to accommodate the extra width of the series.

Projector mount 822 includes an upwardly opening lower pan 1034 that includes a mount wall 1035 and a rectangular perimeter wall 1036. Straps 1012 and the strap of speed controller 1020 are coupled to mount wall 1035. Typically, the Afeet® of the projector are coupled to mount wall 1035. According to some embodiments of the present disclosure, brackets for a particular model projector are provided to couple the project to the base wall. Slots 926, 927 are formed in perimeter wall 1036.

According to alternative embodiments of the present disclosure, other mount configurations are provided. For example, according to one embodiment, the mount configurations of U.S. Design Pat. No. 395,909 is used. According to another embodiment, the mount configuration of U.S. Pat. No. 5,366,203 is used.

Figure 34:
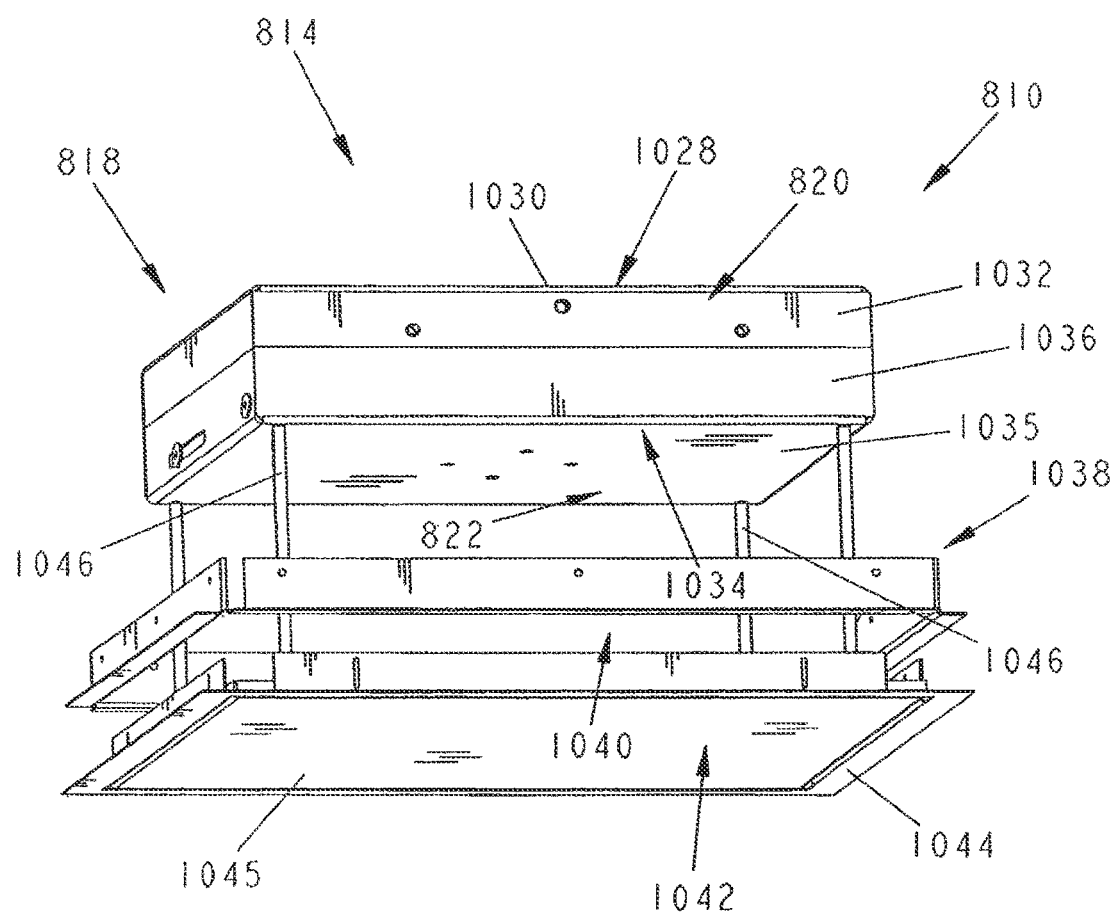
FIG. 34 is a perspective view of the projector lift of FIG. 30 and a support collar showing the projector lift in a fully retracted position.
Figure 35:
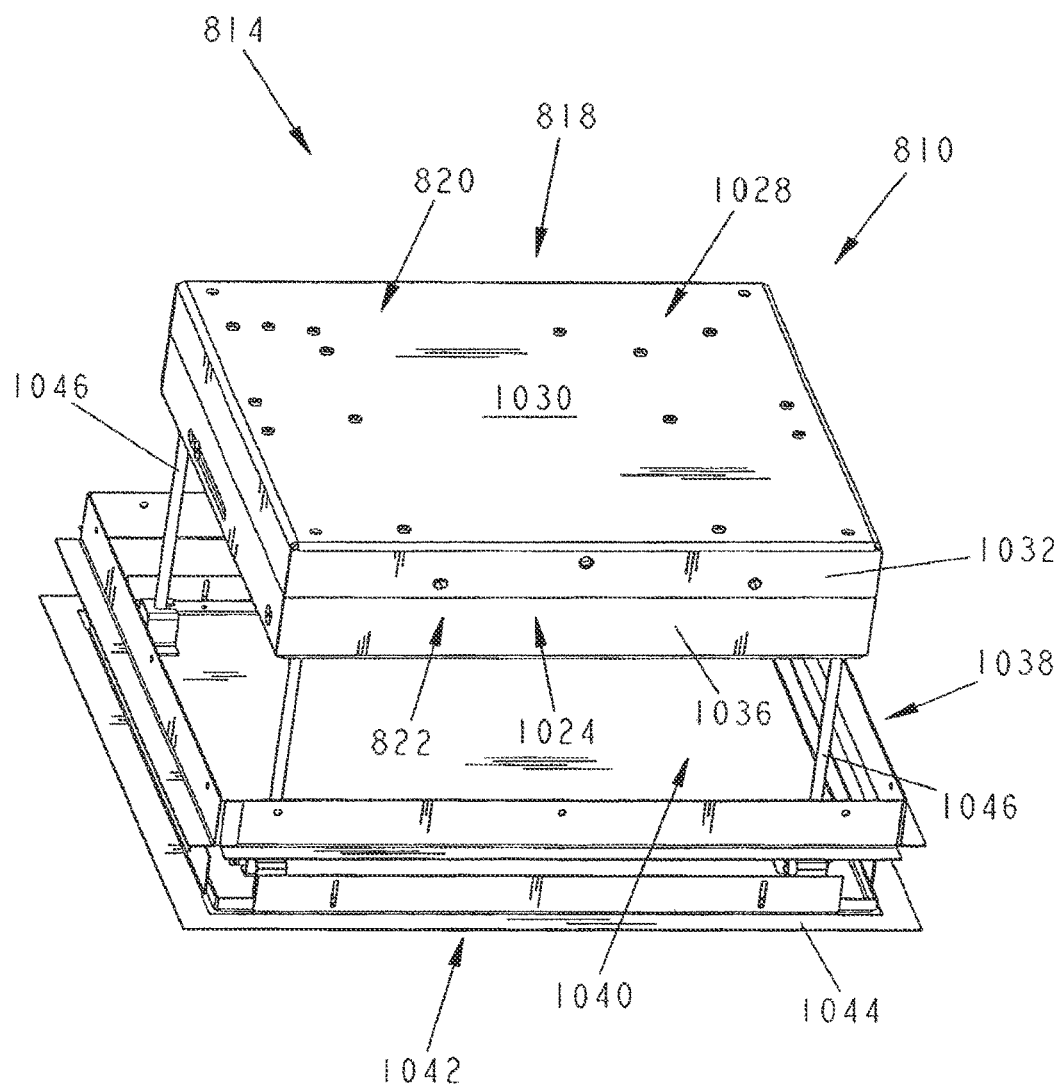
FIG. 35 is another perspective view of the projector lift of FIG. 30 and support collar showing the projector lift in the fully retracted position.
Figure 36:
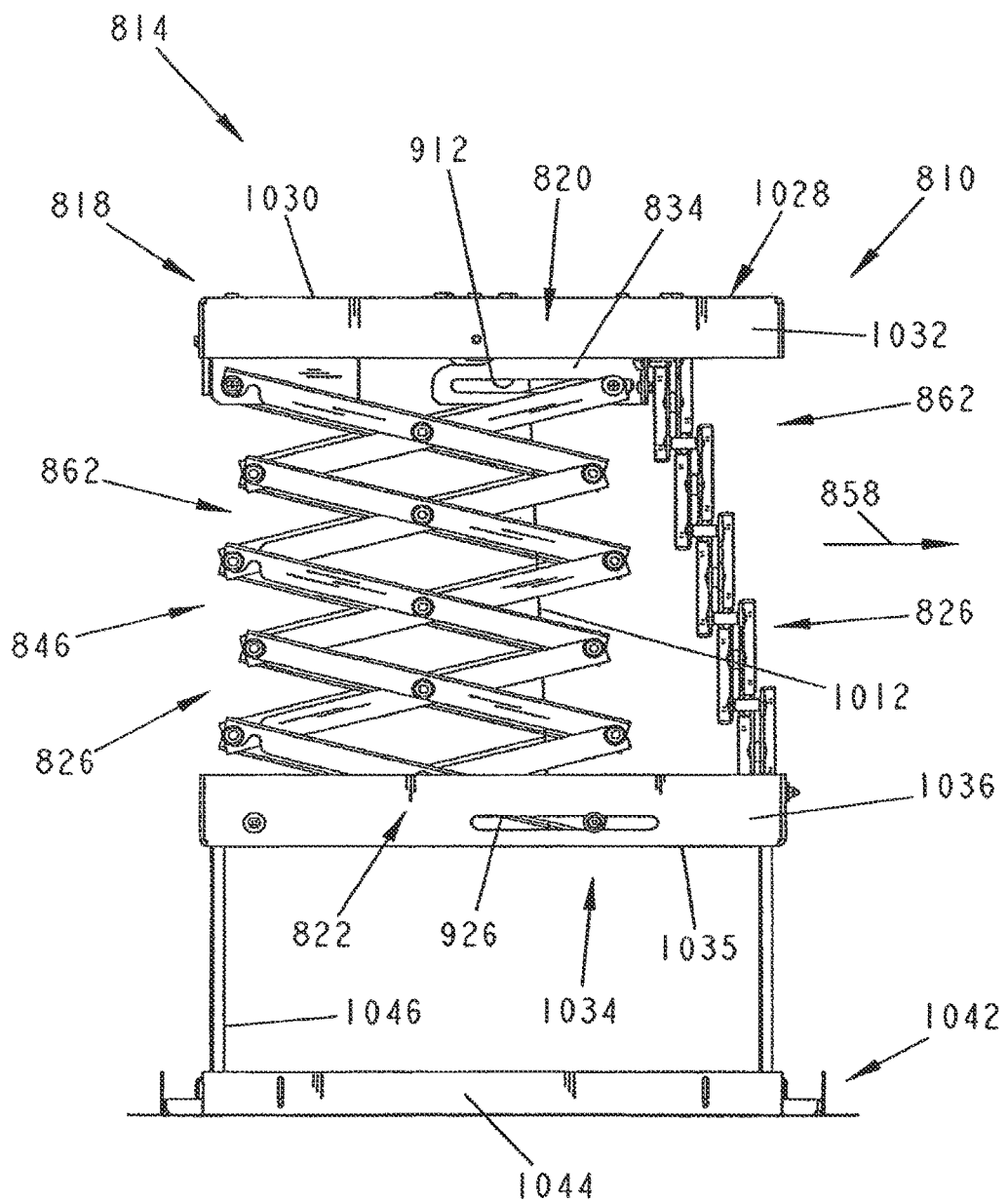
FIG. 36 is a side elevation view of the projector lift of FIG. 30 showing the projector lift in the slightly extended position.
Figure 37:
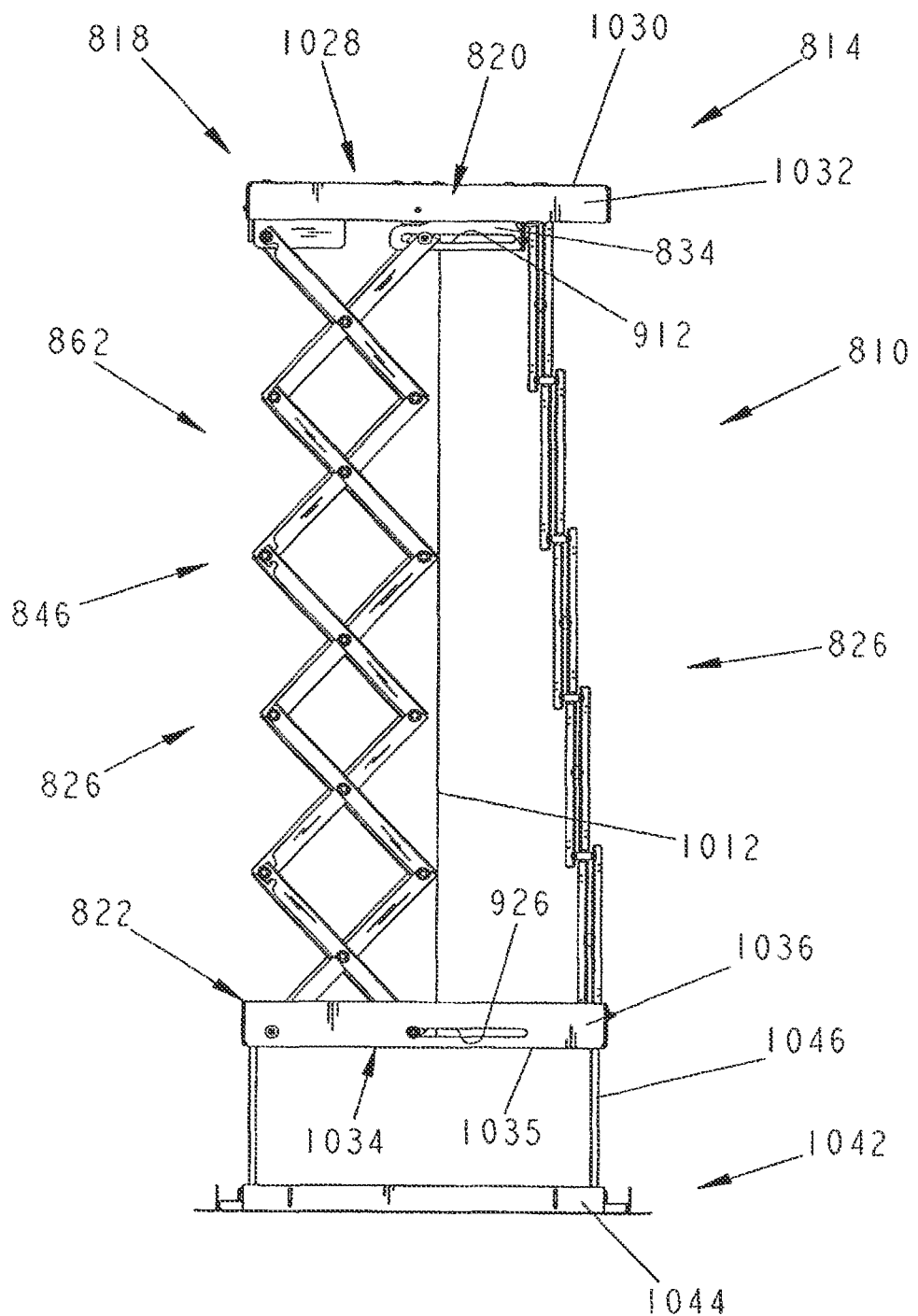
FIG. 37 is a side elevation view of the projector lift of FIG. 30 showing the projector lift in the fully extended position.
Figure 38:
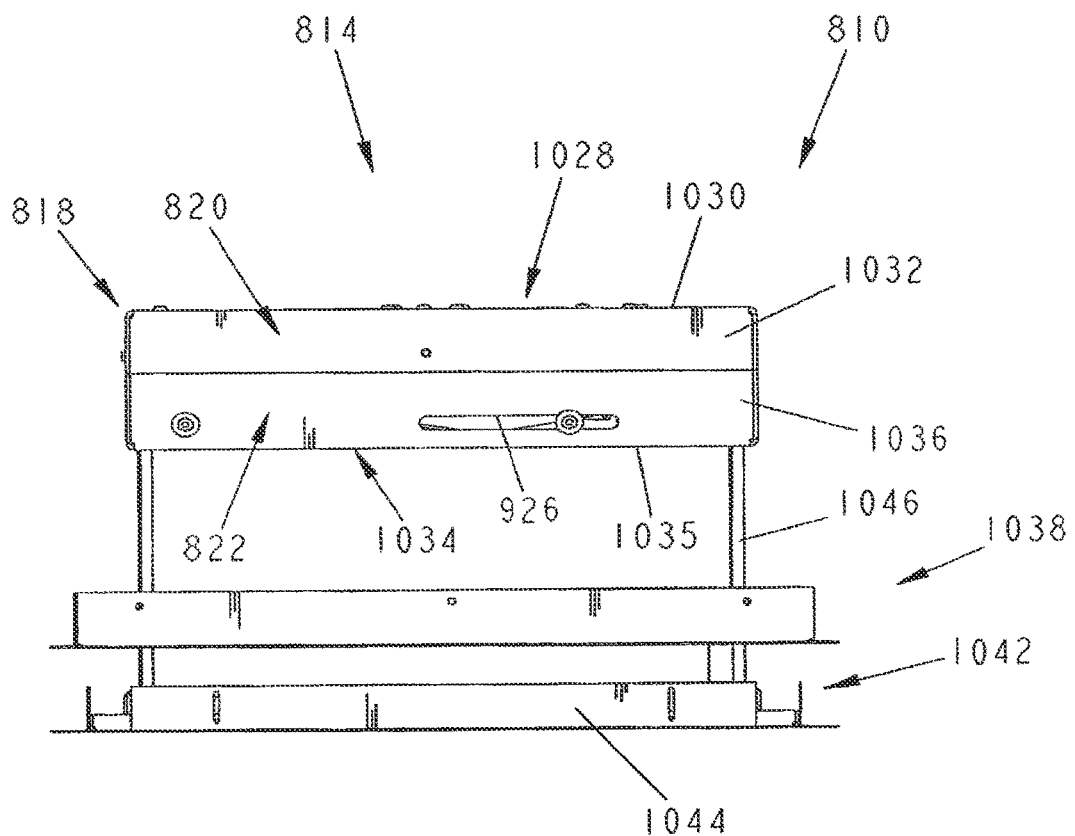
FIG. 38 is a side elevation view of the projector lift of FIG. 30 and support collar showing the projector lift in the fully retracted position.

As shown in FIG. 34, housing 818 has a substantial rectangular box-like shape. According to alternative embodiments, other box-like shapes are provided, such a square-shaped boxes, taller boxes, shorter boxes, circular boxes, or other shapes known to those of ordinary skill in the art.

As shown in FIG. 34, a collar 1038 is typically provided that defines an opening 1040 in the ceiling through which the projector is raised and lowered. The collar 1038 supports the ceiling tile or other ceiling material, such as drywall. In some applications an inverted plenum box (not shown) is coupled to collar 1038 that surrounds projector lift 814. Collar 1038 is not shown in some of the figures for clarity.

According to the preferred embodiment, a ceiling closure 1042 is provided to cover opening 1040 when projector lift 814 is in the storage position. Ceiling closure 1042 includes a ceiling or tile support 1044 configured to support a ceiling tile or other portion of the ceiling, such as drywall, and four threaded tie rods 1046. When projector lift 814 is in the storage position, rods 1046 are cut to length and ceiling support 1044 is coupled to tie rods 1046 by nuts (not shown) so that the ceiling tile is flush with the rest of the ceiling.

Thus, normally ceiling closure 1042 mates with collar 1038 when projector lift 814 is fully retracted.

Figure 42:
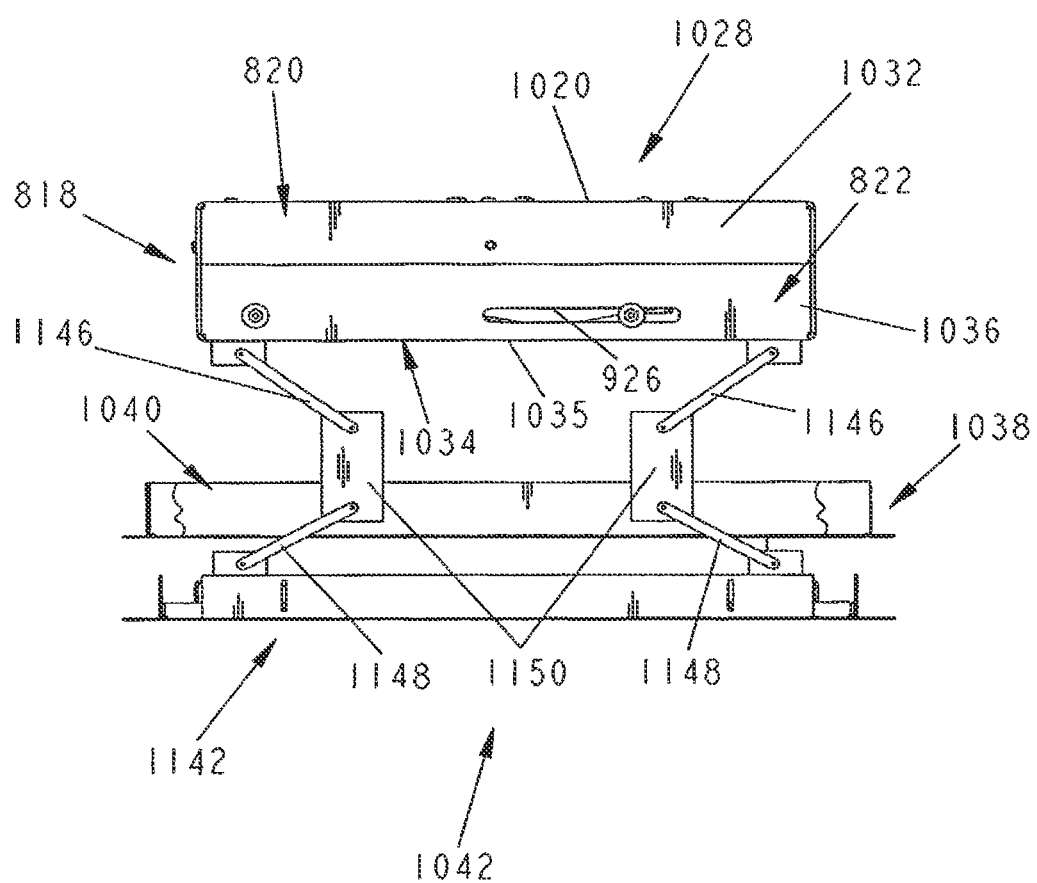
FIG. 42 is side elevation view of an alternative embodiment projector lift showing the projector lift including an adjustable linkage system and tile support for supporting a ceiling tile.

According to an alternative embodiment of the present disclosure shown in FIG. 42, another ceiling closure 1142 is provided having ceiling support 1044. Ceiling closure 1142 includes an adjustable length support 1144 for suspending ceiling support 1042 from projector mount 820. Support 1144 includes a plurality of links 1146, 1148, 1150 that are pivotably coupled to one another and projector mount 820 and ceiling support 1042. After project lift 814 is mounted to the ceiling structure, the fasteners (not shown) holding links 1146, 1148, 1150 in position are loosened to permit links 1146, 1148, 1150 to move relative to one another so that ceiling support 1042 can be raised (or lowered) to mate with collar 1038. Once in the proper position, the fasteners are re-tightened. Thus, an adjustable length support for the closure is provided that can change from a rigid state to a non-rigid state so that the position of the closure relative to the rest of the projector mount can be changed. The length of the adjustable support can therefore be decreased and increased if necessary. According to the present disclosure, other adjustable length supports are provided, such as other link arrangements, scissor pairs, sliding members, chains, resilient members, cables, or other adjustable length supports known to those of ordinary skill in the art.

An audio/visual system 1210 according to a preferred embodiment of the present disclosure is shown in FIGS. 43-47. System 1210 is similar to system 810. Use of reference numbers used to describe system 1210 in FIGS. 43-47 indicates that the component is identical or similar to the component shown in FIGS. 30-41 for system 810. System 1210 includes a projector (not shown) and a projector lift 1214. Lift 1214 is configured to move the projector from a storage position to a use position where the projector shines an image on a projection screen (not shown) or other surface.

Lift 1214 includes three stabilizers 1216 that stabilize projector mount 822 during raising, lowering, and/or operation of the projector. As shown best in FIG. 43, each stabilizer 1216 includes a series 1218 of scissor pairs 1220.

Preferably, each scissor pair 1220 includes a first link 1222 and a second link 1224 coupled to respective first link 1222 by a pair coupler 1226 at a pivot location 1228 to pivot about a pivot axis 1230 as shown in FIG. 45.

First and second links 1222, 1224 of a first pair are preferably coupled to fixed link or bracket 834, 836 of ceiling mount 820 by respective ceiling mount couplers. Similarly, first and second links 1222, 1224 of a fifth or last pair are preferably coupled to projector mount 822 by respective projector mount couplers. First links 1222 of the intermediate pairs are coupled to one another by first link couplers 1242 and second links 1224 of the intermediate pairs are coupled to one another by second link couplers 1244.

According to the preferred embodiment of the present disclosure, the links and couplers are made of plastic. According to alternative embodiments of the present disclosure, the links and couplers are made of other materials such as other plastics, metal, wood, composites, or other materials known to those of ordinary skill in the art.

Second links couplers 1244 include a hollow pin or coupler member 1246 and a blocker or pin 1248 positioned in coupler member 1246 when fully assembled. Coupler member 1246 includes a stud or body portion 1250 and snap fasteners 1252 including a plurality of snap fingers, tab-like flexible members, or flexible tabs 1254 coupled to opposite ends of body portion 1250.

First and second links 1222, 1224 include apertures 1256 sized to receive snap fasteners 1252. Preferably, apertures 1256 extend completely through first and second links 1222, 1224 and are defined by a bearing surface 1258 and a rib 1260. According to alternative embodiments of the present disclosure, the aperture is closed on at least one end and an interior channel is provided to lock with the snap fingers.

Each snap finger 1254 includes a flexible stem portion 1262, a ramp portion 1264, and a catch portion 1266 as shown in FIG. 46. Ramp portion 1264 includes a ramp surface 1268 that contacts rib 1260 during insertion of snap fastener 1252 into aperture 1256. This contact causes flexible stem portion 1262 to deflect inwardly permitting ramp portions 1264 to ride over rib 1260. After ramp portions 1264 pass rib 1260, flexible stem portions 1262 regain their natural position and catch portions 1266 abut rib 1260 to block separation of coupler 1244 from second link 1222.

After couplers 1244 are coupled to second links 1224, coil-spring pins 1248 are inserted into pin-receiving apertures 1270 of coupler members 1246. Before or during insertion, pins 1248 are squeezed to decrease their overall diameter to ease the insertion of pins 1248 into pin-receiving apertures 1270. When released, pins 1248 expand back toward their natural state and block inward flexing of snap fingers 1254. According to alternative embodiments of the present disclosure, other types of blockers are provided. For example, according to one embodiment, a solid pin is provided.

According to the preferred embodiment of the present disclosure, three tabs 1254 are provided on each end of body portion 1250 in a circular pattern. The circular pattern provides a pivot permitting first and second links 1222 to rotate relative to couplers 1244 during raising and lowering of the projector.

According to other alternative embodiments of the present disclosure, other numbers and configurations flexible tabs are provided. For example according to one alternative embodiment of the present disclosure, only one flexible tabs is provided. According to other embodiments, fewer or more than three flexible tabs are provided. According to another alternative embodiments, flexible tabs are only provided on one end of the body portion and the other end is integrally or otherwise coupled to the respective scissor link. According to alternative embodiments of the present disclosure, other snap configurations are provided such as snap rings, Christmas tree fasteners, button snaps, locking tabs, or other snap fasteners known to those of ordinary skill in the art.

Pair couplers 1226 and first link couplers 1242 are substantially similar to each other and similar to second links couplers 1244. However, second link couplers 1244 are substantially longer than pair couplers 1226 and first link couplers 1244 to permit the spanning of links as discussed above. Preferably, second link couplers 1244 have a length that is longer than pair couplers 1226 and first link couplers 1242 by at least the width of first and second links 1222, 1224. According to alternative embodiments of the present disclosure, the couplers are of the same length are provided and used in standard scissor pair arrangement.

As shown in FIG. 45, first and second links 1222, 1224 are substantially identical and include notches 1240 on respective top and bottom sides 1272, 1274 thereof. Notches 1240 are positioned to receive second link coupler 1244 to provide clearance therefor so that first links 1222 can more fully collapse as described above. According to other alternative embodiments, other couplers and/or link arrangements known to those of ordinary skill in the art are provided with or without notches that completely or partially span intermediate links. For example, according to one alternative embodiment, non-scissor, parallel links are provided.

Figure 47:
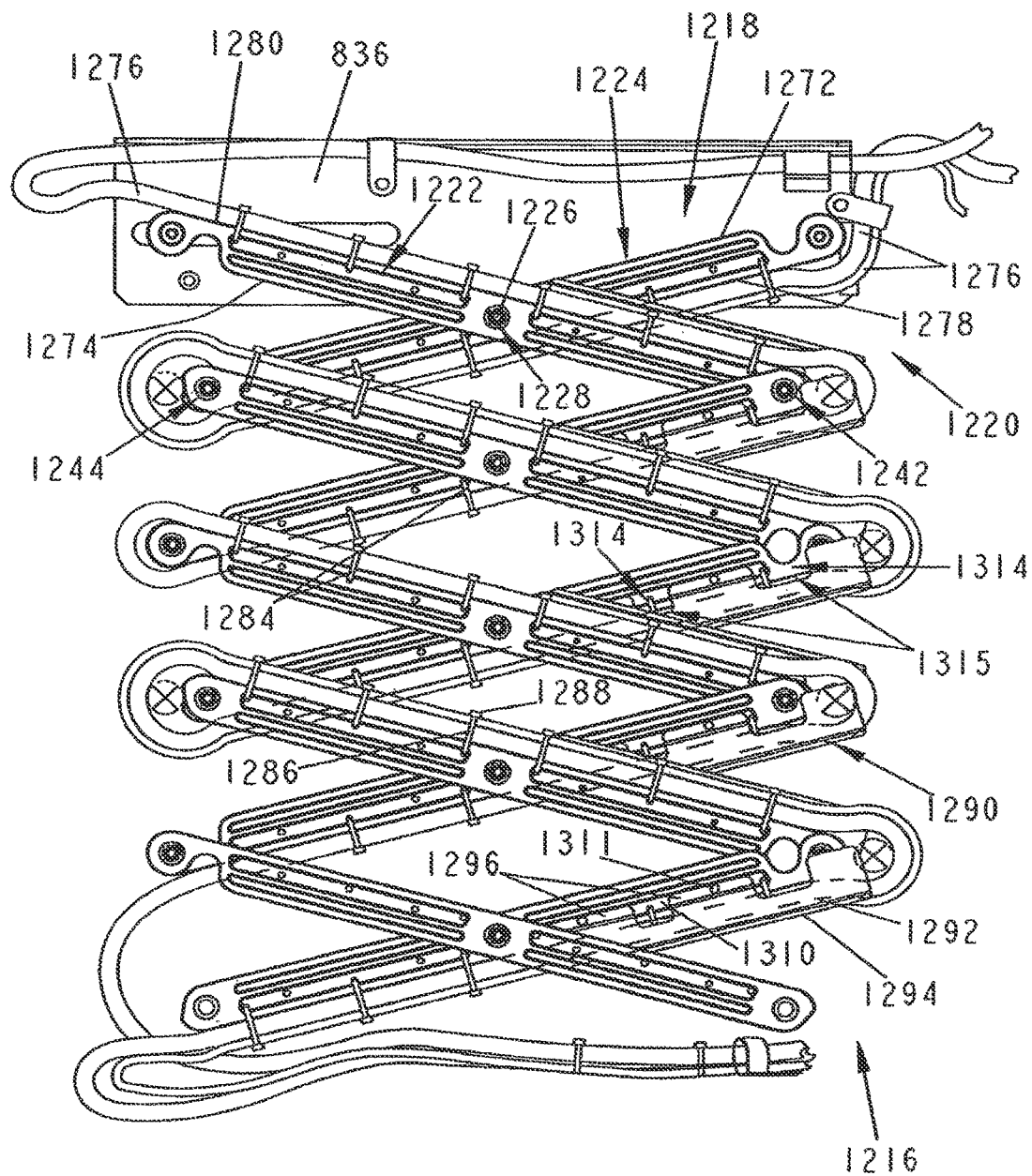
FIG. 47 side elevation view of a stabilizer of the projector lift of FIG. 43 showing cables installed on the stabilizer.

Cables 1276 are provided that extend from ceiling mount 820 to the projector supported on projector mount 822, as shown in FIG. 47, to power and control the operation of the projector or other audio/visual component. According to the preferred embodiment of the present disclosure, cables 1276 extend along top and bottom surfaces 1272, 1278, 1280, 1274 of both first and second links 1222, 1224. As cables 1276 extend down links 1222, 1224, they alternate from being positioned above or below respective top and bottom surfaces 1272, 1278, 1280, 1274.

Cables 1276 extend past the ends of links 1222, 1224 as they transition from one link 1222, 1224 to another link 1224, 1222. Preferably, a space of ⅝ inches (16 millimeters) is provided at the ends of links 1222, 1224 to provide clearance for cable 1276 during raising and lowering.

Couplers 1226 each have a first end positioned axially along the axis of rotation of the link 1222, 1224 that they couple together. The first end is at a first axial location. Similarly, each coupler 1226 has an opposite, second end positioned axially along the axis of rotation at a second axial location (see for example, FIG. 46). A portion of at least one of the first and second cables 1276 supported by the series of scissor pairs has a third axial location. The second axial location of the second end of one of the couplers 1226 is axially positioned between the first axial location of the first end of said coupler 1226 and the third axial location of the portion of the first or second cable 1276. For example, an upper most portion of either cable 1276 is positioned axially inward of the coupler 1226 of the lower scissor pair (see, for example, FIG. 47). The axially inward most end of this lower most coupler 1226 is axially positioned between the upper most portion of each cable 1276 and the axially outward most end of this lower most coupler 1226. zzz Each link 1222, 1224 includes a plurality of coupler-receiving apertures 1282, as shown in FIG. 45, sized to receive cable ties or couplers 1284 as shown in FIG. 47. Each coupler 1284 includes a strap 1286 that extends through aperture 1282 and wraps around the respective cable 1276. Each coupler further includes a ratchet mechanism 1288 that engages a plurality of transverse ridges (not shown) on strap 1286 to lock the position of strap 1286 relative to ratchet mechanism 1288. According to alternative embodiments of the present disclosure, other couplers are provided to couple the cables to the links, such as wires, bands, clips, snaps, or other couplers known to those of ordinary skill in the art.

Figure 44:
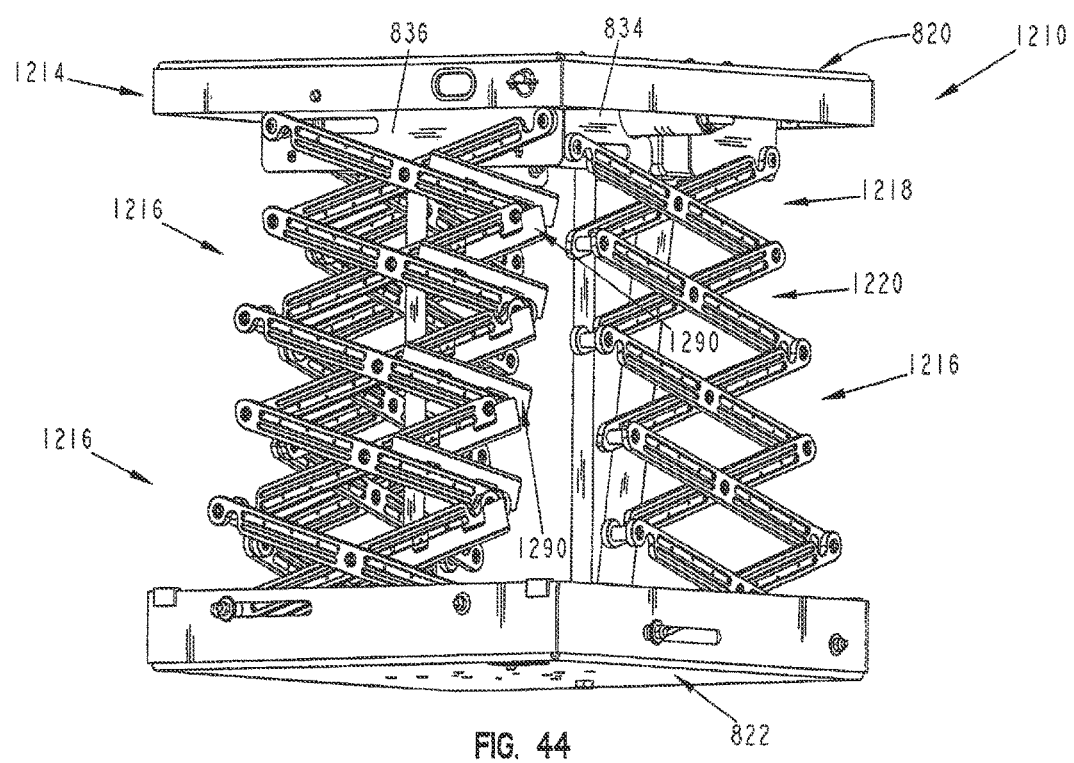
FIG. 44 is another perspective view of the projector lift of FIG. 43.

As shown in FIG. 44, shields 1290 are provided on each second link 1224 at the ends coupled by shorter second links couplers 1244. Shields 1290 are positioned to block cables 1276 from contacting other components of lift 1214 during raising and lowering.

Each shield 1290 is preferably made of stamped sheet metal and includes a shield flange 1292 having bent or flared edges 1294 and a pair of mounting tabs or flanges 1296 having mounting apertures. According to alternative embodiments of the present disclosure, other shield configurations are provided including shields made of other materials such as plastics or other materials known to those of ordinary skill in the art.

Each link 1224 includes a pocket or channel 1310 sized to receive mounting flanges 1296 of shield 1290. Furthermore, each link 1224 includes a plurality of apertures 1312 sized to receive fasteners 1311 that extend through mounting apertures 1298. Mounting flanges 1296 have notches or apertures 1314 therein to permit cable ties 1284 to pass between shields 1290 and links 1224 through apertures 1315.

Shields 1290 are preferably positioned adjacent one another between adjacent links 1224 to block cables 1276 from contacting adjacent links 1224 during raising and lowering. Flared edges 1294 extend in opposite directions to deflect one another in the event of contact therebetween.

Figure 43:
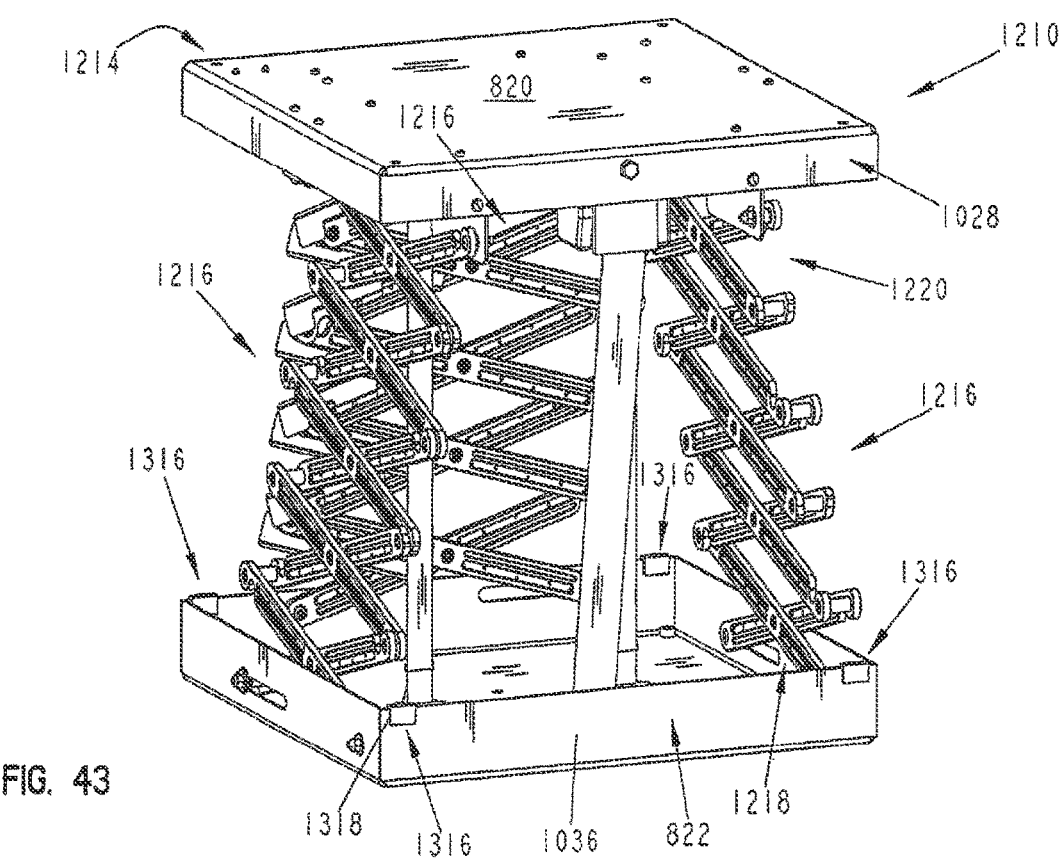
FIG. 43 is a perspective view of another alternative embodiment projector lift showing the projector lift in a slightly extended position.

According to the preferred embodiment of the present disclosure, four bumpers 1316 are provided adjacent the upper corners of perimeter wall 1036 of lower pan 1034 to absorb shock caused by lower pan 1034 contacting upper pan 1028 as shown in FIG. 43. Each bumper 1316 is preferably U-shaped and made of a 1.0 inch (25.4 millimeter) long rubber extrusion. Each bumper 1316 includes a channel 1318 that receives perimeter wall 1036. Preferably, perimeter wall 1036 includes four notches (not shown) used to locate bumpers 1316 in the positions shown in FIG. 43. The notches also provide a relief under bumpers 1316 to avoid extreme pinching of the rubber material between upper and lower pans 1028, 1034.

According to alternative embodiments of the present disclosure, the lifts of the present disclosure are configured to support other audio/visual components, such as speakers, slide projectors. LCD projectors, receivers, VCR=s, DVD players, TV=s, or other audio/visual or other components known to those of ordinary skill in the art. Furthermore, according to other alternative embodiments of the present disclosure, the lifts are configured to support components in other locations in a room. For example, according to one alternative embodiment of the present disclosure, the lift is configured to raise a TV from the floor of a room. According to other alternative embodiments of the present disclosure, the lift is configured to move other objects between two positions. For example, according to one embodiment of the present disclosure, the lift is configured to raise and lower the backboard of an adjustable height basketball backboard. According to other alternative embodiments of the present disclosure, the series of extension units are configured for use in other applications in which telescoping members, scissor pairs, or other extension units are used. For example, according to one embodiment of the present disclosure, multiple series of scissor pairs according to the present disclosures are coupled together in a side-by-side arrangement to form a retractable mesh for use in such applications as store-front security gates or mesh elevators gates.

Preferably, instructions for the assembly, installation, and/or use of the devices disclosed herein are provided with said devices or otherwise communicated to permit a person or machine to assemble, install and/or use such devices. Such instructions may include a description of any or all portions of the devices and/or any or all of the above-described assembly, installation, and use of the devices. Furthermore, such instructions may describe the environment in which the devices are used. The instructions may be provided on separate papers and/or the packaging in which the device is sold or shipped. Furthermore, the instructions may be embodied as text, pictures, audio, video, or any other medium or method of communicating instructions known to those of ordinary skill in the art.

Although the present invention has been described in detail with reference to preferred embodiments, variations and modifications exist within the scope and spirit of the present invention as described and defined in the following claims.

The invention claimed is:

1. A projector lift adapted to support a projector from a ceiling, the projector lift comprising:
    a ceiling mount adapted to be coupled to a ceiling of a room, the ceiling mount having an outer perimeter;
    a projector mount having an outer perimeter, the outer perimeter of the ceiling mount and the outer perimeter of the projector mount cooperating to define a column of space between the ceiling mount and the projector mount; and
    a series of links coupled to the ceiling mount, coupled to the projector mount, and extending between the ceiling mount and the projector mount, at least a portion of the series of links being positioned within the column of space, wherein the projector mount is adapted to support the projector with the projector positioned completely below the series of links and the column of space between the ceiling mount and the projector mount.

2. The projector lift of claim 1, wherein the series of links includes a first link coupled to the ceiling mount and a second link coupled to the projector mount, and the first and second links are positioned entirely within the column of space.

3. The projector lift of claim 1, wherein the ceiling mount includes a vertical wall forming the outer perimeter of the ceiling mount, and at least one link of the series is coupled to the ceiling mount within an interior region formed by the vertical wall.

4. The projector lift of claim 1, wherein the projector mount includes a vertical wall forming the outer perimeter of the projector mount, and at least one link of the series is coupled to the projector mount within an interior region formed by the vertical wall.

5. The projector lift of claim 1, wherein the series of links is positioned entirely within the column of space.

6. The projector lift of claim 1, further including a second series of links extending between the ceiling mount and the projector mount, the second series of links being spaced apart from the series of links, at least a portion of the second series of links being positioned within the column of space.

7. The projector lift of claim 1, further including a driver configured to raise and lower the projector mount, the driver being positioned within the column of space.

8. The projector lift of claim 7, the driver including a shaft and at least one flexible coupler adapted to wrap around the shaft, wherein rotation of the shaft causes extension and retraction of the flexible coupler to move the projector mount relative to the ceiling mount.

9. The projector lift of claim 1, further including a cable extending along the series of links, the cable being positioned within the column of space.

10. The projector lift of claim 1, wherein the series of links includes a series of scissor pairs having an extended length and a retracted length.

11. A projector lift adapted to support a projector from a ceiling, the projector lift comprising:
    a ceiling mount adapted to be coupled to a ceiling of a room, the ceiling mount including a perimeter wall and a bracket positioned in an interior region formed by the perimeter wall;
    a projector mount; and
    a series of links extending between the ceiling mount and the projector mount to support the projector mount, at least one link of the series of links being coupled to the bracket of the ceiling mount, wherein the projector mount is adapted to support the projector with the projector positioned completely below the series of links and the column of space between the ceiling mount and the projector mount.

12. The projector lift of claim 11, wherein the at least one link is positioned between the bracket and a nearest wall portion of the perimeter wall.

13. The projector lift of claim 11, wherein the series of links includes a series of scissor pairs having an extended length and a retracted length, each scissor pair including first and second scissor links coupled together by a coupler to rotate relative to each other about an axis of rotation, a first scissor pair being coupled to the bracket of the ceiling mount.

14. The projector lift of claim 11, the projector mount including a perimeter wall forming an interior region, at least one link of the series of links being positioned in the interior region formed by the perimeter wall of the projector mount.

15. The projector lift of claim 14, wherein the at least one link positioned in the interior region of the projector mount is coupled to the perimeter wall of the projector mount.

16. The projector lift of claim 14, wherein the projector mount is adapted to support a projector positioned below the perimeter wall of the projector mount.

17. The projector lift of claim 11, wherein the perimeter wall of the ceiling mount is vertical and includes four corners.

18. The projector lift of claim 1, wherein an upper surface of the projector mount is configured to abut a lower surface of the ceiling mount when the projector lift is in a fully retracted position.

* * * * *